(12) United States Patent
Hou

(10) Patent No.: US 10,513,037 B2
(45) Date of Patent: Dec. 24, 2019

(54) CONTROL METHOD AND SYSTEM, AND MOBILE ROBOT USING THE SAME

(71) Applicant: ANKOBOT (SHANGHAI) SMART TECHNOLOGIES CO., LTD., Shanghai (CN)

(72) Inventor: Xiru Hou, Shanghai (CN)

(73) Assignee: ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 16/144,129

(22) Filed: Sep. 27, 2018

(65) Prior Publication Data
US 2019/0184571 A1    Jun. 20, 2019

Related U.S. Application Data

(63) Continuation of application No. PCT/CN2018/090655, filed on Jun. 11, 2018.

(30) Foreign Application Priority Data

Dec. 15, 2017  (CN) .......................... 2017 1 1352639

(51) Int. Cl.
*G05B 15/00*    (2006.01)
*G05B 19/00*    (2006.01)
(Continued)

(52) U.S. Cl.
CPC ............... *B25J 9/1697* (2013.01); *A47L 1/00* (2013.01); *B25J 5/007* (2013.01); *B25J 9/0003* (2013.01);
(Continued)

(58) Field of Classification Search
CPC ........ B25J 9/1697; B25J 5/007; B25J 9/0003; G05D 1/0246; G05D 2201/0215
(Continued)

(56) References Cited

U.S. PATENT DOCUMENTS 8,209,074 B2 *   6/2012  Sonoura ................. G05D 1/024
                                                          701/23
9,317,035 B2 *   4/2016  Nakamura ........... G05D 1/0038
(Continued)

FOREIGN PATENT DOCUMENTS

CN        105511478        4/2016
CN        107291080        10/2017

OTHER PUBLICATIONS

International Patent Application No. PCT/CN2018/090655, International Search Report and Written Opinion with English translation of Opinion, dated Jul. 30, 2018.

*Primary Examiner* — Harry Y Oh
(74) *Attorney, Agent, or Firm* — Leber IP Law; David C. Robertson

(57) ABSTRACT

The present application provides a control method and system, and mobile robot using the same. The mobile robot comprises: a storage device, configured to store a simultaneous localization and mapping application and a behavior control application; an image acquisition device, configured to acquire images of an operating environment; a processing device, configured to control the image acquisition device to capture pictures in order to acquire an image containing the ground, and invoke the simultaneous localization and mapping application and the behavior control application to control the behaviors of the mobile robot when identified that the image contains flexible obstacle; and a movement system, configured to drive the mobile robot to move based on a control instruction output by the processing device. In the present application, the flexible obstacle can be detected effectively, and the behaviors of the mobile robot can be controlled correspondingly based on detection results.

16 Claims, 4 Drawing Sheets

(51) Int. Cl.
*B25J 9/16* (2006.01)
*B25J 5/00* (2006.01)
*B25J 9/00* (2006.01)
*G05D 1/02* (2006.01)
*A47L 1/00* (2006.01)

(52) U.S. Cl.
CPC ... *G05D 1/0246* (2013.01); *G05D 2201/0203* (2013.01); *G05D 2201/0215* (2013.01)

(58) Field of Classification Search
USPC .......................................................... 700/259
See application file for complete search history.

(56) References Cited

U.S. PATENT DOCUMENTS

| | | | | |
|---|---|---|---|---|
| 9,878,445 | B2* | 1/2018 | Angle | B25J 5/007 |
| 2002/0153855 | A1* | 10/2002 | Song | G05D 1/0038 |
| | | | | 318/568.12 |
| 2004/0158357 | A1* | 8/2004 | Lee | B60L 15/2036 |
| | | | | 700/258 |
| 2010/0286905 | A1* | 11/2010 | Goncalves | G01C 21/12 |
| | | | | 701/532 |
| 2012/0121161 | A1* | 5/2012 | Eade | G09B 29/007 |
| | | | | 382/153 |
| 2013/0116826 | A1* | 5/2013 | Kim | G05D 1/0246 |
| | | | | 700/259 |
| 2014/0115797 | A1* | 5/2014 | Duenne | A47L 9/009 |
| | | | | 15/3 |
| 2014/0119609 | A1* | 5/2014 | Lee | G06K 9/6215 |
| | | | | 382/106 |
| 2014/0198955 | A1* | 7/2014 | Deigmoeller | G06T 7/223 |
| | | | | 382/107 |
| 2014/0266684 | A1* | 9/2014 | Poder | G08B 25/003 |
| | | | | 340/521 |
| 2016/0114488 | A1* | 4/2016 | Mascorro Medina | |
| | | | | B25J 9/1697 |
| | | | | 700/259 |
| 2016/0144512 | A1* | 5/2016 | Kim | H04N 13/246 |
| | | | | 15/319 |
| 2016/0202703 | A1* | 7/2016 | Matsubara | G05D 1/0219 |
| | | | | 701/24 |
| 2017/0360266 | A1* | 12/2017 | Izawa | A47L 9/28 |
| 2018/0039835 | A1* | 2/2018 | Rajkumar | B25J 9/1697 |
| 2018/0065242 | A1* | 3/2018 | Tanaka | B25J 5/007 |
| 2018/0075403 | A1* | 3/2018 | Mascorro Medina | |
| | | | | G06Q 30/016 |
| 2018/0079081 | A1* | 3/2018 | Chen | B25J 9/0003 |
| 2018/0098676 | A1* | 4/2018 | Ryu | H04B 17/318 |
| 2018/0101154 | A1* | 4/2018 | Nomoto | G01J 1/4204 |
| 2018/0113467 | A1* | 4/2018 | Kim | G05D 1/0274 |
| 2018/0296049 | A1* | 10/2018 | Izawa | A47L 9/28 |
| 2018/0373852 | A1* | 12/2018 | Tsubota | G05D 1/0011 |
| 2019/0038099 | A1* | 2/2019 | Hoshino | A47L 9/28 |

* cited by examiner

CONTROL METHOD AND SYSTEM, AND MOBILE ROBOT USING THE SAME

RELATED APPLICATION

This application is a continuation application of International Patent Application No. PCT/CN2018/090655, filed Jun. 11, 2018, which claims priority to Chinese Patent Application No. 201711352639.6, filed Dec. 15, 2017, the entire contents of which are hereby incorporated by reference.

TECHNICAL FIELD

The present application relates to the technical field of mobile robots, particularly to a control method and system, and mobile robot using the same.

BACKGROUND OF THE INVENTION

A mobile robot is a machine which can work automatically. The mobile robot can be operated under the command of human operators or in pre-programmed programs, and can act according to principles set out by the artificial intelligence technology as well. This type of mobile robot can be used indoors or outdoors, and can be used in industry, business or household. For example, the mobile robot can be used to replace security guards to perform patrol, or replace people to clean the surface. The mobile robot can also be used to accompany family members or assist in doing office work.

When mobile robot like cleaning robot, accompanying robot or guest-guiding robot moves under an operating mode, due to the complexity of the operating environments, the mobile robot may often hit obstacles so as to damage furniture and itself in the operating process because of an unfavorable obstacle avoidance performance thereof, thereby influencing normal operation of the mobile robot. Wheels of the mobile robot often get entangled with some flexible obstacles (e.g., cables, ropes, ribbons, leftover of cloth), so that the mobile robot cannot move, and even the mobile robot may tip over to cause safety accidents. For a cleaning robot, the cleaning system of the cleaning robot may be more likely to be entangled by flexible obstacles, for example, cleaning brushes may be entangled by flexible obstacles, or a dust collection component may be entangled or blocked by flexible obstacles.

Generally speaking, in order to detect obstacles on the floor such as ground in time, obstacle detection technologies often adopted on the existing mobile robot are mainly as follows:

Mechanical collision detection: a mechanical baffle connected with an electronic switch is arranged at the front of the bottom of the mobile robot, when the mobile robot comes into contact with obstacles, the electronic switch is converted into a connected state from a disconnected state, so as obstacles in the front can be detected. In this way, detection of obstacle can be performed only after collision occurs, and thus contribute to a poor user experience. Moreover, flexible obstacles are easily pushed away by the mobile robot, the electronic switch cannot be triggered because the collision force between robot and obstacles is too small, thereby leading to a missing detection.

Infrared distance measurement detection: one or more infrared distance measurement sensors are arranged on the mobile robot. And obstacles in the front can be detected in the case of the detected distance is smaller than a preset threshold. However, infrared detection is greatly influenced by ambient lighting, and there is a greater dead zone within a short distance. Obstacles made from glass, light-absorbing or all-black materials are easily missed in detection, and the consistency of precisions is poor. Because of the structure limitations, the infrared sensor cannot be arranged on the lower part of housing, thus some obstacles which are lower than the infrared rays, e.g., flexible obstacles, may be missed in detection.

Ultrasonic distance measurement detection: one or more ultrasonic distance measurement sensors are arranged on the mobile robot. And obstacles in the front can be detected in the case of the detected distance is smaller than a preset threshold. However, on the one hand, ultrasonic waves are easily influenced by factors such as ambient temperature, material of reflectors and multipath propagation of sound waves. On the other hand, Because of the structure limitations, the ultrasonic sensor cannot be arranged on the lower part of housing, thus some obstacles which are lower than the ultrasonic waves, e.g., flexible obstacles, may be missed in detection. In addition, another limitation of ultrasonic measurement is that it depends on the effective reflection area of the obstacle, such that object with a size greater than a certain threshold can be detected, smaller object such as wires can be easily missed.

Therefore, it can be seen that the detection of flexible obstacles is the problem that needs to be solved urgently for the existing mobile robot.

SUMMARY OF THE INVENTION

The objective of the present application is to disclose a control method and system, and mobile robot using the same, for improving precision in detecting flexible obstacles by mobile robot.

In one aspect, the present application provides a method for controlling a mobile robot, wherein the mobile robot comprises an image acquisition device, and the method comprises the following steps: under an operating mode of the mobile robot, controlling the image acquisition device to capture pictures in order to acquire images containing the ground; and identifying at least one image containing the ground captured by the image acquisition device, and controlling the behaviors of the mobile robot when identified that the at least one image contains flexible obstacle.

In some embodiments, the step of identifying at least one image containing the ground captured by the image acquisition device comprises: acquiring at least one image containing the ground from the images captured by the image acquisition device; and identifying the at least one image containing the ground by a flexible obstacle image classifier to obtain identified results.

In some embodiments, the method further comprises the following steps: acquiring positions of matching features in at least two images, and determining the position and pose of the mobile robot based on the corresponding relationship between an image coordinate system and a physical space coordinate system and based on the positions of the matching features, wherein, the at least two images contains an image at the previous time and an image at the current time; acquiring at least one image, determining position of flexible obstacle in the at least one image based on the positions of features in the at least one image, and determining the size information of the flexible obstacle based on a standard measure in the at least one image; and controlling the behaviors of the mobile robot based on the determined position and pose of the mobile robot and based on the position and size information of the flexible obstacle.

In some embodiments, the manner of acquiring the positions of matching features in the at least two images comprises tracking positions of corresponding features contained in the at least two images, wherein, the corresponding features are a pair of matching features.

In some embodiments, the manner of determining the size information of the flexible obstacle based on a standard measure in the at least one image comprises: identifying a reference object with a known size in the at least one image; and calculating the size information of the flexible obstacle in the at least one image based on the size of the reference object.

In some embodiments, the method further comprises a step of acquiring movement information of the mobile robot.

In some embodiments, the step of controlling the behaviors of the mobile robot comprises any one of the following steps: controlling the mobile robot to move according to the original navigation route and cross the flexible obstacle; controlling the mobile robot to modify the original navigation route, move according to the modified navigation route and cross the flexible obstacle; controlling the mobile robot to modify the original navigation route, move according to the modified navigation route to avoid the flexible obstacle.

In some embodiments, the step of controlling the behaviors of the mobile robot comprises: controlling the mobile robot to stop moving.

In some embodiments, the method further comprises a step of controlling the mobile robot to send alarm information.

In another aspect, the present application provides a mobile robot. The mobile robot comprises: a storage device, configured to store a simultaneous localization and mapping application and a behavior control application; an image acquisition device, configured to acquire images of an operating environment under an operating mode of the mobile robot; a processing device, connected with the storage device and the image acquisition device, and configured to control the image acquisition device to capture pictures in order to acquire an image containing the ground under an operating mode of the mobile robot, and invoke the simultaneous localization and mapping application and the behavior control application from the storage device to control the behaviors of the mobile robot when identified that the image contains flexible obstacle; and a movement system, connected with the processing device, and configured to drive the mobile robot to move based on a control instruction output by the processing device.

In some embodiments, the image acquisition device is arranged at the top surface of the mobile robot, or at a side surface of the mobile robot, or at the junction of the top surface and a side surface of the mobile robot.

In some embodiments, the processing device is configured to acquire at least one image containing the ground from the images captured by the image acquisition device, and identify the at least one image containing the ground by a flexible obstacle image classifier to obtain identified results.

In some embodiments, the processing device is configured to invoke the simultaneous localization and mapping application and the behavior control application from the storage device to perform the following steps: acquiring positions of matching features in at least two images, and determining the position and pose of the mobile robot based on the corresponding relationship between an image coordinate system and a physical space coordinate system and based on the positions of the matching features, wherein, the at least two images contains an image at the previous time and an image at the current time; acquiring at least one image, determining position of flexible obstacle in the at least one image based on the positions of features in the at least one image, and determining the size information of the flexible obstacle based on a standard measure in the at least one image; and controlling the behaviors of the mobile robot based on the determined position and pose of the mobile robot and based on the position and size information of the flexible obstacle.

In some embodiments, the mobile robot further comprises a tracking device, which is connected with the image acquisition device and configured to track positions of corresponding features contained in the at least two images to acquire positions of matching features in the at least two images, wherein, the corresponding features are a pair of matching features.

In some embodiments, the mobile robot further comprises a movement sensing device which is connected with the processing device and configured to acquire movement information of the mobile robot.

In some embodiments, the manner of invoking the simultaneous localization and mapping application and the behavior control application from the storage device to control the behaviors of the mobile robot comprises any of the following ways: sending the control instruction to the movement system to control the mobile robot to move according to the original navigation route and cross the flexible obstacle; sending the control instruction to the movement system to control the mobile robot to modify the original navigation route, move according to the modified navigation route and cross the flexible obstacle; and sending the control instruction to the movement system to control the mobile robot to modify the original navigation route, move according to the modified navigation route to avoid the flexible obstacle.

In some embodiments, the step of invoking the simultaneous localization and mapping application and the behavior control application from the storage device to control the behaviors of the mobile robot comprises: sending the control instruction to the movement system to control the mobile robot to stop moving.

In some embodiments, the mobile robot further comprises an alarm device which is connected with the processing device and configured to output alarm information when the processing device identified that the image contains flexible obstacle.

In some embodiments, the mobile robot further comprises a cleaning system which is connected with the control system and configured to clean the ground during the movement of the mobile robot.

In yet another aspect, the present application provides a system for controlling a mobile robot, wherein the mobile robot is configured with an image acquisition device, and the system comprises: a storage device, configured to store a simultaneous localization and mapping application and a behavior control application; and a processing device, connected with the storage device and the image acquisition device, and configured to control the image acquisition device to capture pictures in order to acquire an image containing the ground under an operating mode of the mobile robot, and invoke the simultaneous localization and mapping application and the behavior control application from the storage device to control the behaviors of the mobile robot when identified that the image contains flexible obstacle.

As mentioned above, the control method and system, and mobile robot using the same of the present application have the following advantageous effect: through the technical solution in which an image acquisition device can be controlled to capture images containing the ground, at least one captured image containing the ground is identified, and the behaviors of the mobile robot are controlled when identified that the image contains flexible obstacle, the flexible obstacle can be detected effectively, and the behaviors of the mobile robot can be controlled correspondingly based on detection results.

DETAILED DESCRIPTION

Figure 1:
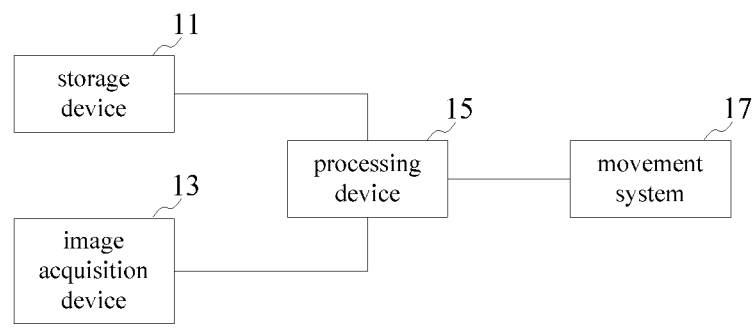
FIG. 1 is a structural schematic diagram of the mobile robot of the present application in one embodiment.

Implementations of the present application will be described below through specific embodiments, and those skilled in the art can easily understand other advantages and effects of the present application from the contents disclosed in the present specification.

In the following description, several embodiments of this application are described combined with the drawings. However, it should be understood that other embodiments may be available, and any changes in mechanical composition, structure, electrical and operation may be made without departing from the spirit and scope of the application. The following detailed description is not to be considered as limited, and the scope of the embodiments of the present invention is defined by the appended claims. The terminology used herein is only for describing particular embodiments, spatial-related terms such as "up", "down", "left", "right", "below", "top", "above", "bottom", etc., may be used in the text for illustrating the relationship of one element or feature to another element or feature.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

The present application relates to the field of mobile robot. A mobile robot is a machine which can work automatically. The mobile robot can be operated under the command of human operators or in pre-programmed programs, and can act according to principles set out by the artificial intelligence technology as well. This type of mobile robot can be used indoors or outdoors, and can be used in industry, business or household. For example, the mobile robot can be used to replace security guards to perform patrol, or replace people to clean the surface. The mobile robot can also be used to accompany family members or assist in doing office work. By taking cleaning robot as an example, the cleaning robot which also named as automatic sweeper or intelligent vacuum cleaner belongs to intelligent household appliances, and can perform cleaning tasks such as sweeping, dust collecting and floor mopping. Specifically, the cleaning robot can be operated under the command of human operators (for example, the operator takes a remote control in hand) or based on preset rules.

Due to complexity of the operating environments, the mobile robot may bump against various obstacles when it moves under an operating mode. Therefore, it is necessary for a mobile robot to detect obstacles timely and make corresponding adjustments in behaviors. However, in the prior art, during the operating process of the mobile robot, some obstacles may be mis-detected, especially for flexible obstacles. With the cleaning robot as an example, for example, when the cleaning robot works indoors, flexible obstacles (such as cables, ropes and ribbons, etc.) on the ground cannot be easily detected through conventional infrared distance measurement detection or ultrasonic ranging measurement detection. And if no corresponding behavior control is performed on the cleaning robot, these flexible obstacles may entangle wheels of the cleaning robot, such that the cleaning robot cannot move, and even seriously, the cleaning robot may fall to the ground to cause safety accidents. In addition, the cleaning system of the cleaning robot may be entangled, for example, cleaning brushes may be entangled, or a dust collection component may be entangled or blocked, such that the cleaning robot cannot clean the surface.

For mobile robots used in other application scenarios which being analogized based on the example of the above-mentioned mobile robot, in order to improve detection on flexible obstacles and corresponding behavior control of the mobile robot, the present application provides a system for controlling a mobile robot, namely, control system of the mobile robot. Please refer to FIG. 1 which is a structural schematic diagram of the mobile robot of the present application in one embodiment. As shown in FIG. 1, the mobile robot includes a storage device 11, an image acquisition device 13, a processing device 15 and a movement system 17.

The storage device 11 stores a simultaneous localization and mapping application and a behavior control application.

The simultaneous localization and mapping application, namely, SLAM (Simultaneous Localization and Mapping) application, is a basic application in the field of intelligent robots. The localization technology of the mobile robot can include a process in which the mobile robot can determine its position and orientation (or pose) relative to its surroundings, and the mobile robot which can build map about its surroundings can locate itself in the map, so as to show its degree of autonomy. The problem can be described as follows: when the mobile robot is in an unknown environment, how would the mobile robot can gradually describe a complete map of the environment on the one hand, and determine along which direction the mobile robot should travel on the other hand, that is to say, in order to realize intelligence, three tasks need to be completed, firstly, localization, secondly, mapping, and thirdly, the subsequent navigation. The behavior control application in the present application indicates that the navigation of the mobile robot is controlled and the orientation (or pose) is adjusted based on the set information or instructions. Herein, "pose" includes the position of the mobile robot (for example, x coordinate and y coordinate) in the motion space, and angle orientation of the mobile robot relative to the reference object (e.g., wall) or reference direction in the motion space. It should be noted that, in order to compensate the error of a map built based on an SLAM technology, a technology based on visual simultaneous localization and mapping (VSLAM) can compensate the errors of the movement information provided by the sensor based on image data provided by an image sensor, and can provide a more accurate navigation capability for the cleaning robot.

As a basic application in the field of intelligent robots, the behavior control application is associated with the processing device 15 and the movement system 17, such that the processing device 15 can control the movement system 17 by utilizing the behavior control application. In actual applications, the behavior control application can combine with the above SLAM application, based on the localization information and map information obtained through the SLAM application, the processing device 15 can send the control instruction and control the movement system 17 to execute corresponding behaviors. Herein, "behavior" includes the movement and pose of the mobile robot.

In addition, the storage device 11 further stores standard physical features of at least one standard component. Wherein the standard component refers to the standard component which is designed based on at least one standard selected from the industrial standard, national standard, international standard and customized standard. For example, the industrial standard may be mechanical industry standard JB, building material industry standard JC, etc.; the national standard may be GB standard of China, DIN standard of Germany and BS standard of the UK, etc.; the international standard may be international ISO standard; and the customized standard will be described in detail below. The standard physical feature can include overall dimension, standard structural relationship, etc. For example, the standard physical features of a standard component include the actual physical length, width and height of a standard component, and other actual physical size data of corresponding standard in the standard component, for example, the spacing between two holes on a power socket, the length and width of the power socket, the length and width of a floor board or a floor tile, and the length, width and thickness of a carpet.

Herein, the storage device 11 includes, but is not limited to, a read-only memory (ROM), a random access memory (RAM), and a nonvolatile RAM (NVRAM), for example, one or more disc storage devices, flash memory devices or other non-volatile solid state storage devices. In some embodiments, the storage device 11 can include a storage away from one or more processors, for example, a network attached memory accessed via an RF circuit or an external port and a communication network (not shown). Wherein the communication network may be an Internet, one or more intranets, a local area network (LAN), a wireless local area network (WLAN), a storage area network (SAN) or an appropriate combination thereof. A memory controller may control the access of other assemblies of the mobile robot such as a central processing unit (CPU) and a peripheral interface to the storage device.

Figure 2:
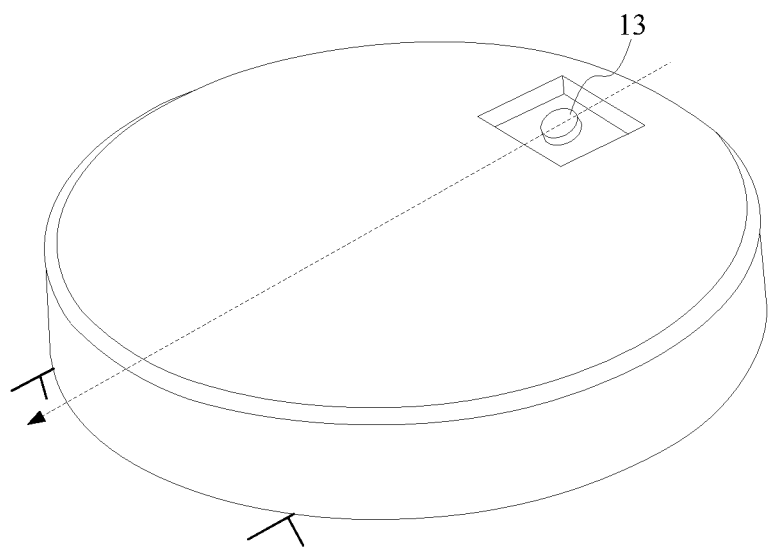
FIG. 2 is a schematic diagram of the cleaning robot equipped with the image acquisition device of the present application in one embodiment.
Figure 3:
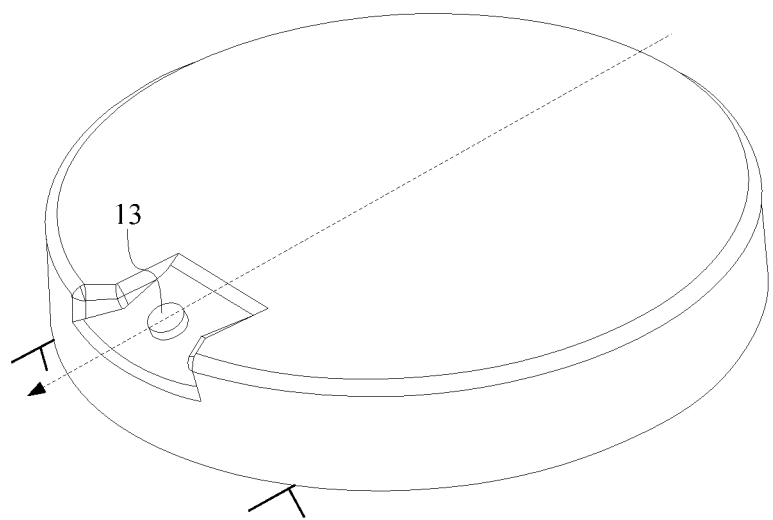
FIG. 3 is a schematic diagram of the cleaning robot equipped with the image acquisition device of the present application in another embodiment.
Figure 4:
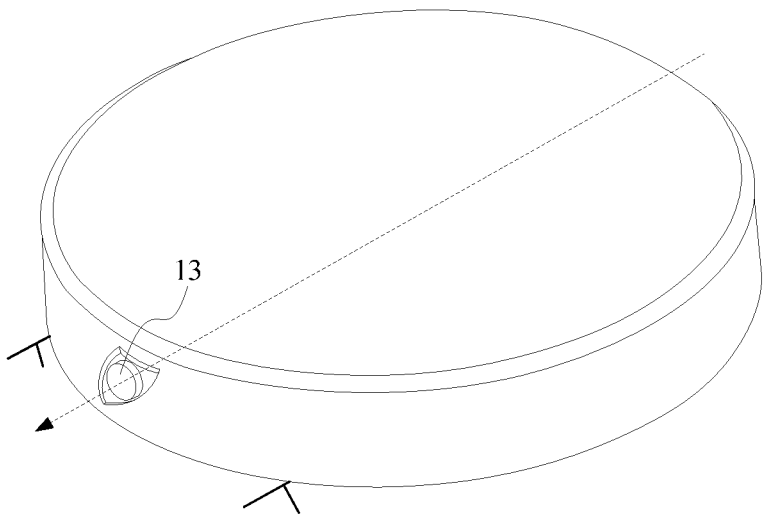
FIG. 4 is a schematic diagram of the cleaning robot equipped with the image acquisition device of the present application in yet another embodiment.
Figure 5:
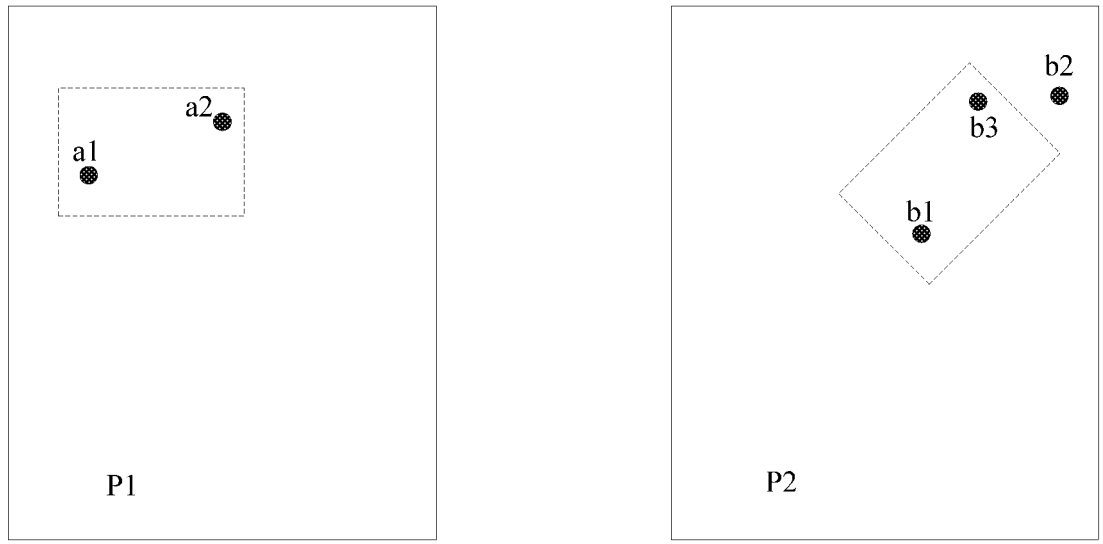
FIG. 5 is schematic diagram of position change relationship among matching features in two images acquired at the previous time and the current time.

The image acquisition device 13 is configured to acquire images of the operating environment under an operating mode of the mobile robot. The image acquisition device 13 includes, but is not limited to, a camera, a video camera, an image acquisition module integrated with an optical system or a CCD chip, and an image acquisition module integrated with an optical system and a CMOS chip. A power supply system of the image acquisition device 13 can be controlled by a power supply system of the mobile robot. During movement of the mobile robot when being powered on, the image acquisition device 13 starts to capture images and provides the images to the processing device 15. For example, the captured indoor images are cached in the storage device 11 in a preset video format by the image acquisition device of the cleaning robot and are acquired by the processing device 15. The image acquisition device 13 is configured to capture images during movement of the mobile robot. Herein, in some embodiments, the image acquisition device 13 may be arranged at the top surface of the mobile robot, for example, taking the cleaning robot as an example, the image acquisition device in the cleaning robot may be arranged in the middle or at the edge of the top surface of the housing thereof. Please referring to FIG. 2, which is a schematic diagram of the cleaning robot equipped with the image acquisition device of the present application in one embodiment. As shown in FIG. 2, for example, the housing of the cleaning robot has a flat cylindrical structure, and the housing with the flat cylindrical structure includes a disk-shaped top surface and a side surface connected to the outer circumference of the top surface. The housing with the flat cylindrical structure has a better environmental adaptability when the cleaning robot moves (such forward, backward, steering, and rotation). In addition, the housing of the cleaning robot may has a rectangular column structure, a triangular prism structure, or a semi-elliptic cylindrical structure (also referred as a D-shaped structure). In FIG. 2, the arrow points to the forward direction of the cleaning robot. When the cleaning robot moves forward, the end of the housing that is closest to the forward direction is the front end (the end opposite to the front end is the rear end). In the cleaning robot shown in FIG. 2, the equipped image acquisition device 13 is arranged at the rear end of the top surface. The angle between the optic axis of the field of view of the image acquisition device and the vertical line is ±30°. For example, the angle between the optic axis of the image acquisition device of the cleaning robot and the vertical line is −30°, −29°, −28°, −27° . . . −1°, 0°, 1°, 2° . . . 29° or 30°. In some embodiments, the image acquisition device 13 can be arranged at the junction of the top surface and a side surface of the mobile robot. For example, at least one concave structure (the concave structure can be arranged at the front end, the rear end or the side end of the housing) is arranged at the junction of the top surface and the side surface of the housing of the cleaning robot, and the image acquisition device is arranged inside the concave structure. Please referring to FIG. 3, which is a schematic diagram of the cleaning robot equipped with the image acquisition device of the present application in another embodiment. As shown in FIG. 3, the image acquisition device 13 in this embodiment is arranged at the junction of the top surface and the side surface which is at the front end of the housing of the cleaning robot. The angle α between the optic axis of the lens in the image acquisition device and the plane defined by the top surface of the housing (the plane defined by the top surface of the housing can be consistent with the horizontal plane, namely, when the mobile robot is stably placed in a horizontal plane, the plane defined by the top surface of the housing is in parallel with the horizontal plane) is in a range from 61° to 85°, that is to say, the angle α between the optic axis of the lens in the image acquisition device and the plane defined by the top surface of the housing is 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°. The lens in the image acquisition device is designed to lean forward, so more environmental information can be captured by the lens. For example, compared with an image acquisition device with the lens facing upward vertically, the image acquisition device which is designed to lean forward can capture more environmental images in front of the cleaning robot, for example, part of the ground area in front of the cleaning robot. It should be noted that, those skilled in the art should understand that the angle between the optic axis and the vertical line or the top surface of the housing is only an example but not to limit the accuracy of the angle thereof within the range of 1°. The accuracy of the angle may be higher according to the actual design requirements of the mobile robot, for example, more than 0.1°, 0.01° or the like. Endless examples will not be recited herein. In some embodiments, the image acquisition device 13 may be arranged at a side of the mobile robot, and the side may be a side at the front end, a side at the rear end, or a side at the side end. Please referring to FIG. 4, which is a schematic diagram of the cleaning robot equipped with the image acquisition device of the present application in yet another embodiment. As shown in FIG. 4, the image acquisition device 13 in this embodiment is arranged at the front end of the side surface. In addition, in order to protect the image acquisition device, as shown in FIG. 4, at least one concave structure can be arranged at front end of the side surface of the housing, and the image acquisition device 13 is disposed in the concave structure, such that the image acquisition device 13 cannot protrude from the front end of the side surface.

The processing device 15 includes one or more processors. The processing device 15 is operably coupled to a read-only memory, a random access memory and/or a non-volatile memory in the storage device 11. The processing device 15 can execute instructions stored in the read-only memory, the random access memory and/or the non-volatile memory to execute operations in the robot, for example, extracting features in the images and performing localization in a map based on the features, or acquiring images and identifying the images. Therefore, the processor may include one or more general-purpose microprocessors, one or more application specific integrated circuits (ASIC), one or more digital signal processors (DSP), one or more field programmable gate arrays (FPGA) or any combination thereof. The processing device 15 is also operably coupled to an I/O port and an input structure, wherein the robot can interact with various other electronic apparatus by the I/O port, and the user can interact with a computing apparatus by the input structure. Therefore, the input structure may include a button, a keyboard, a mouse, a touchpad and the like. The other electronic apparatus may be a mobile motor in the movement device of the mobile robot, or a slave processor dedicated to the control of the movement device and the cleaning device in the mobile robot, for example, a microcontroller unit (MCU).

In an example, the processing device 15 is connected with the storage device 11 and the image acquisition device 13 respectively through data cables. The processing device 15 interacts with the storage device 11 through a data read-write technology, and the processing device 15 interacts with the image acquisition device 13 through an interface protocol, wherein the data read-write technology includes, but is not limited to, a high-speed/low-speed data interface protocol, a database read-write operation and the like. The interface protocol includes, but is not limited to, an HDMI interface protocol, a serial interface protocol and the like.

The processing device 15 is configured to control the image acquisition device to capture pictures in order to acquire images containing the ground under an operating mode of the mobile robot, and invoke a simultaneous localization and mapping application and a behavior control application to control the behaviors of the mobile robot when identified that the image contains flexible obstacle.

The processing device 15 is configured to acquire at least one image from the images captured by the image acquisition device 13, and identify the at least one image to detect whether the at least one image contains flexible obstacle.

As mentioned above, generally speaking, when a mobile robot moves on an operating plane (for example, the ground) under an operating mode, flexible obstacles on the ground may be mis-detected. Therefore, in the present application, under an operating mode of the mobile robot, the image acquisition device 13 can be controlled to capture images containing the ground, and the "ground" herein can be specifically the surface to which the mobile robot will move subsequently according to a travelling path. With the cleaning robot as an example, in some embodiments, the image acquisition device 13 can be used to capture images of the ground in front of the travelling direction of the cleaning robot.

The identification of flexible obstacles in the at least one image is realized by utilizing a flexible obstacle image classifier, that is, during identification, the images to be identified are input into the flexible obstacle image classifier and then identified results can be output. In the present embodiment, the flexible obstacle image classifier include a trained convolutional neural network. The convolutional neural network (CNN) is a type of system architecture of deep neural networks, and is closely related to image processing. A weight sharing network structure of the convolutional neural network makes the convolutional neural network more similar to the biological neural network, and such structure not only lowers the complexity of network model, but also reduces the number of weights, and this type of network structure has high invariance on translation, proportional scaling, tilting or transformations in other forms. The convolutional neural network can take images as an input of the network directly, thereby avoiding processes of complex feature extraction and data reconstruction in traditional identification algorithms. Based on these advantages, the convolutional neural network has exceptional advantages in image identification.

The flexible obstacle image classifier includes the trained convolutional neural network.

In some embodiments, the process of training can include: firstly, the step of making the training sample sets, wherein, the training samples can include images containing flexible obstacles conforming to preset rules. And then, the step of training based on the training sample sets so as to obtain a flexible obstacle image classifier. Here, when making the training sample sets, in one implementation, images of flexible obstacles conforming to preset rules can be collected automatically, for example, images of related flexible obstacles can be searched from the network or images of related flexible obstacles can be captured automatically, and images of typical flexible obstacles conforming to preset rules are selected from the above-mentioned images to serve as training samples. While in other implementations, part or all of the images of flexible obstacles selected from the existing standard library of various flexible obstacles can be served as training samples, for example, part or all of the images of flexible obstacles can be selected from different standard libraries of flexible obstacles respectively, and the selected images can be combined to form training sample sets, or, at least one standard library is selected from different standard libraries of flexible obstacles, and part or all of the images in the selected at least one standard library are determined to be training sample sets. Herein, the images containing flexible obstacles which serve as training samples can be simple images with a single background (for example, the background can be of a single pure color) or can be images under an environmental background. Since in the present application, the images captured by the image acquisition device 13 under the control of the mobile robot are images containing the ground, the images serving as training samples can be ground images containing the flexible obstacles. As to specific flexible obstacles, in the present application, the flexible obstacles include, but are not limited to, the following types: cables, ropes, ribbons, shoelaces, towels, leftover of cloth, cotton fibres, and plant vines. As to the ground, based on the applied environment, the ground includes, but is not limited to, the following types: cement ground, varnished ground, ground paved with laminate flooring, ground paved with solid wood flooring, and ground paved with carpets. Therefore, for specific flexible obstacles, corresponding training sample sets can be made, that is, the following training sample sets can be made: a cable training sample set corresponding to cables (for example, images of various cables shown in different forms on different grounds), a rope training sample set corresponding to ropes (for example, images of various ropes shown in different forms on different grounds), a ribbon training sample set corresponding to ribbons (for example, images of various ribbons shown in different forms on different grounds), a training sample set of the leftover of cloth corresponding to the leftover of cloth (for example, images of various leftover of cloth shown in different forms on different grounds), a cotton fibre training sample set corresponding to cotton fibres (for example, images of various cotton fibres shown in different forms on different grounds), and a plant vine training sample set corresponding to plant vines (for example, images of various plant vines shown in different forms on different grounds), and so on. In addition, before the training sample set is trained, images in the training sample set can be preprocessed correspondingly. In some embodiments, the preprocess includes, but is not limited to, performing tailoring, compressing, grayscale processing, image filtering and/or noise filtering on the images in the training sample set.

In some embodiments, the process of training can include: firstly, the step of making the training sample sets, wherein, the training samples can include images containing flexible obstacles conforming to preset rules which serve as positive samples, and images containing no flexible obstacles or images containing flexible obstacles not conforming to preset rules which serve as negative samples. And then, the step of training based on the training sample sets so as to obtain a flexible obstacle image classifier. Here, with respect to the step of collecting the images containing flexible obstacles conforming to preset rules as positive samples, in one implementation, images of flexible obstacles conforming to preset rules can be collected automatically, for example, images of related flexible obstacles are searched from the network or images of related flexible obstacles are captured automatically, and images of typical flexible obstacles conforming to preset rules are selected therefrom to serve as positive samples. While in other implementations, part or all of the images of flexible obstacles selected from the existing standard library of various flexible obstacles can be served as positive samples, for example, part or all of the images of flexible obstacles can be selected from different standard libraries of flexible obstacles and the selected images can be combined to form a positive sample set, or, at least one standard library is selected from different standard libraries of flexible obstacles, and part or all of the images in the selected at least one standard library are determined to be positive samples. Herein, the images containing flexible obstacles which serve as positive samples can be simple images with a single background (for example, the background can be of a single pure color) or can be images under an environmental background. Since in the present application, the images captured by the image acquisition device 13 under the control of the mobile robot are images containing the ground, the images serving as positive samples can be ground images containing the flexible obstacles. As to specific flexible obstacles, in the present application, the flexible obstacles can include, but are not limited to, the following types: cables, ropes, ribbons, shoelaces, towels, leftover of cloth, cotton fibres, and plant vines. As to the ground, based on the applied environment, the ground includes, but is not limited to, the following types: cement ground, varnished ground, ground paved with laminate flooring, ground paved with solid wood flooring, and ground paved with carpets. Therefore, for specific flexible obstacles, corresponding positive samples can be made, that is, the following positive sample sets can be made: a cable positive sample set corresponding to cables (for example, images of various cables shown in different forms on different grounds), a rope positive sample set corresponding to ropes (for example, images of various ropes shown in different forms on different grounds), a ribbon positive sample set corresponding to ribbons (for example, images of various ribbons shown in different forms on different grounds), a positive sample set of leftover of cloth corresponding to leftover of cloth (for example, images of various leftover of cloth shown in different forms on different grounds), a cotton fibre positive sample set corresponding to cotton fibres (for example, images of various cotton fibres shown in different forms on different grounds), and a plant vine positive sample set corresponding to plant vines (for example, images of various plant vines shown in different forms on different grounds), and so on. With respect to the step of collecting the images containing no flexible obstacles or images containing flexible obstacles not conforming to preset rules as negative samples, in one implementation, images containing no flexible obstacles or containing flexible obstacles not conforming to preset rules can be collected automatically, for example, related images containing no flexible obstacles or images containing flexible obstacles not conforming to preset rules are searched from the network, or images containing no flexible obstacles or images containing flexible obstacles not conforming to preset rules are captured automatically, and images containing no flexible obstacles or images containing flexible obstacles not conforming to preset rules are selected therefrom to serve as negative samples. While in other implementations, part or all of the images selected from the existing various standard libraries containing no flexible obstacles can be served as negative samples, for example, part or all of the images are selected from different standard libraries containing no flexible obstacles respectively, and the selected images are combined to form negative sample sets, or, at least one standard library is selected from different standard libraries containing no flexible obstacles, and part or all of the images in the selected at least one standard library are determined to be negative samples. As to specific flexible obstacles, in the present application, the flexible obstacles can include, but are not limited to, the following types: cables, ropes, ribbons, shoelaces, towels, leftover of cloth, cotton fibres, and plant vines. As to the ground, based on the applied environment, the ground includes, but is not limited to, the following types: cement ground, varnished ground, ground paved with laminate flooring, ground paved with solid wood flooring, and ground paved with carpets. Therefore, for specific flexible obstacles, corresponding negative sample sets can be made, that is, the following negative sample sets can be made: a cable negative sample set corresponding to cables (for example, images containing no cables or images containing cables not conforming to preset rules on different grounds), a rope negative sample set corresponding to ropes (for example, images containing no ropes or images containing ropes not conforming to preset rules on different grounds), a ribbon negative sample set corresponding to ribbons (for example, images containing no ribbons or images containing ribbons not conforming to preset rules on different grounds), a negative sample set of leftover of cloth corresponding to leftover of cloth (for example, images containing no leftover of cloth or images containing leftover of cloth not conforming to preset rules on different grounds), a cotton fibre negative sample set corresponding to cotton fibres (for example, images containing no cotton fibres or images containing cotton fibres not conforming to preset rules on different grounds), and a plant vine negative sample set corresponding to plant vines (for example, images containing no plant vines or images containing plant vines not conforming to preset rules on different grounds), and so on. In addition, before the training sample set is trained, images in the training sample set can be preprocessed. In some embodiments, the preprocess includes, but is not limited to, performing intercepting, compressing, grayscale processing, image filtering and/or noise filtering on the images in the training sample set.

Next, a flexible obstacle image classifier obtained through training can be used to identify images. In the present application, during image identification, the images to be identified are input into the flexible obstacle image classifier, and then the flexible obstacle image classifier outputs corresponding identified results. In some embodiments, the identification of images by the flexible obstacle image classifier can at least include the following steps: performing image preprocessing on the images to be identified; performing feature extraction on the preprocessed images; and inputting the features of the images to be identified into the flexible obstacle image classifier to obtain identified results.

Wherein, the step of performing image pre-processing on the images to be identified includes, but is not limited to, performing tailoring, compressing, grayscale processing and thresholding processing on the images to be identified. In addition, the pre-processing can also include image filtering, noise filtering, etc. With grayscale processing and thresholding processing as examples, grayscale processing is performed on the images to be identified to obtain grayscale images, and thresholding processing is performed on the grayscale images (for example, the grayscale images after binarization processing can be converted into binary images which can reflect overall and local features of images, namely black-and-white images). The step of performing feature extraction on the preprocessed images includes, but is not limited to, extracting contour features and textual features of images to be identified.

It should be noted that, in some embodiments, the above flexible obstacle image classifier used for identifying flexible obstacles can be pre-stored in a storage device 11. In one implementation, before the mobile robot is sold to a terminal user (for example, before the mobile robot is manufactured for delivery, or before the mobile robot is distributed to each point of sells, or before the mobile robot is sold to a terminal user at the point of sells), the flexible obstacle image classifier is written into the storage device 11. Generally, the flexible obstacle image classifier can be set with a permission, based on which the terminal users are forbidden from modifying the flexible obstacle image classifier. However, the flexible obstacle image classifier is not limited to what is described here. For example, the flexible obstacle image classifier can also open part or all of the permissions, and allow the terminal user to modify (for example, modification or adding or deleting operation). Or, the flexible obstacle image classifier can perform update operations after the mobile robot is connected to a network and is in communication connection with the corresponding manufacturer server or application service provider server. In other implementations, the flexible obstacle images can be stored in a cloud system which is in remote communication with the mobile robot, therefore, during image identification, the processing device 15 can acquire at least one image from the images captured by the image acquisition device 13 and send the at least one image to the cloud system which is in remote communication with the mobile robot, and the flexible obstacle image classifier in the cloud system identifies the at least one image and sends the identified results to the mobile robot in a remote manner.

Therefore, through the technical solution in which the processing device 15 is used to acquire at least one image from the images captured by the image acquisition device 13, and a flexible obstacle image classifier is used to identify the at least one image, whether the at least one image contains flexible obstacle can be detected, and the specific type of the existing flexible obstacles can be obtained.

The processing device 15 is further configured to invoke the simultaneous localization and mapping application and the behavior control application from the storage device 11 to control the behaviors of the mobile robot when identified that the image contains flexible obstacle.

The processing device 15 is configured to invoke the localization and mapping application to execute the following steps: acquiring positions of matching features in at least two images, and determining the position and pose of the mobile robot based on the corresponding relationship between an image coordinate system and a physical space coordinate system and based on the positions of matching features, wherein, the at least two images contains an image at the previous time and an image at the current time. In addition, for example, the physical space coordinate system can be camera coordinate system or world coordinate system.

In the present application, the storage device 11 stores the corresponding relationship between an image coordinate system and a physical space coordinate system. Wherein, the image coordinate system is created based on image pixel points, and two-dimensional coordinate parameters of image pixel points in the image captured by the image acquisition device 13 can be described by the image coordinate system. The image coordinate system can be a rectangular coordinate system, a polar coordinate system or the like. For the physical space coordinate system, i.e., a coordinate system created based on each position in an actual two-dimensional or three-dimensional physical space, the physical space position thereof can be described in the physical space coordinate system according to the corresponding relationship between a preset image pixel unit and a unit length (or a unit angle). The physical space coordinate system can be a two-dimensional rectangular coordinate system, a polar coordinate system, a spherical coordinate system, a three-dimensional rectangular coordinate system or the like. For example, the physical space coordinate system can be camera coordinate system or world coordinate system.

For a mobile robot used in a scenario where the surface (e.g., ground) complexity is not high, the corresponding relationship can be pre-stored in the storage device before delivery. However, for a mobile robot used in a scenario where the surface complexity is high, for example, a cleaning robot, the corresponding relationship can be obtained by performing field test on the site used and then stored in the storage device 11. In some embodiments, the mobile robot further includes a movement sensing device (not shown in the figure) used to acquire movement information about the robot. Wherein, the movement sensing device includes but is not limited to: a displacement sensor, a gyroscope, a speed sensor, a ranging sensor, an optical floor tracking sensor and a cliff sensor. During movement of the robot, the movement sensing device continuously senses movement information and provides the movement information for the processing device. The displacement sensor, the gyroscope, the optical floor tracking sensor and the speed sensor can be integrated in one or more chips. The ranging sensor and a cliff sensor can be arranged at the side of the robot. For example, the ranging sensor in the cleaning robot is arranged at the edge of a housing; and the cliff sensor in the cleaning robot is arranged at the bottom of the robot. According to the type and number of the sensors arranged in the robot, the movement information acquired by the processing device includes but is not limited to: displacement information, angle information, information about distance between robot and an obstacle, velocity information and advancing direction information.

To create the corresponding relationship, in some embodiments, the mobile robot includes initialization device (not shown in the figure). The initialization device creates the corresponding relationship based on the positions of the matching features in two image frames and the movement information acquired from the previous time to the current time, wherein, the at least two images contains an image at the previous time and an image at the current time. Here, the initialization device can be a program module, wherein, the program thereof is stored in the storage device, and is executed via the invoking of the processing device. If the corresponding relationship is not stored in the storage device, the initialization device is invoked by the processing device to create the corresponding relationship.

Herein, during the movement of the robot, the initialization device acquires the movement information provided by the movement sensing device and each image provided by the image acquisition device 13. To reduce the accumulative errors of the movement sensing device, the initialization device can acquire the movement information and at least two image frames within a small period of time during which the robot moves. For example, the initialization device acquires the movement information and at least two image frames when monitoring that the robot moves in a straight line. And for example, the initialization device acquires the movement information and at least two image frames when monitoring that the robot moves angularly. Wherein, the time interval between acquiring at least two images when the robot moves angularly can be shorter than the time interval between acquiring at least two images when the robot moves in a straight line.

Then, the initialization device identifies and matches features in all images, and obtains image positions of the matching features in each image. Wherein, the features include but are not limited to corner features, edge features, line features and curve features. For example, the initialization device can acquire the image positions of the matching features using the tracking device (not shown in the figure). The tracking device is used to track positions of corresponding features (corresponding visual features) contained in two image frames.

The initialization device creates the corresponding relationship according to the image positions and the physical space position provided via the movement information. Here, the initialization device can create the corresponding relationship by creating feature coordinate parameters of the physical space coordinate system and the image coordinate system. For example, the initialization device can create the corresponding relationship between the physical space coordinate system and image coordinate systems by taking the physical space position where the image captured at the previous time as the origin of the physical space coordinate system and corresponding the coordinate origin to the positions of the matching features of the images in the image coordinate system.

It should be noted that the working process of the initialization device can be executed based on the instruction of a user or is transparent to the user. For example, the execution process of the initialization device is started on the basis that the corresponding relationship is not stored in the storage device 11 or the corresponding relationship is required to be updated. It will not be limited herein.

The corresponding relationship can be stored in the storage device in the manner such as programs corresponding algorithms, databases or the like. Thus, the software assembly stored in the storage includes an operating system, a communication module (or an instruction set), a contact/motion module (or an instruction set), a pattern module (or an instruction set), and an application (or an instruction set). In addition, the storage device further stores temporary data or persistent data including images captured by the image acquisition device, and the positions and poses obtained when the processing device performs localization computation.

After the corresponding relationship is created, the processing device acquires a matching feature in the image at the current time and the matching feature in the image at the previous time, and determines the position and pose of the robot according to the corresponding relationship and the features. Wherein, the matching feature in this application is an image feature which is in different images and conforms to preset matching degree. That is, the manner of acquiring a matching feature in the image at the current time and the matching feature in the image at the previous time is the manner of acquiring a visual feature in an image at the current time and the corresponding visual feature in an image at the previous time, wherein, the visual feature and the corresponding visual feature are called matching feature both.

Herein, the processing device 15 can acquire an image frame at the previous time t1 and an image frame at current time t2 according to a preset time interval or image frame number interval, and identify and match the features in two image frames. Wherein, according to the design of processing capabilities of hardware and software, the time interval can be between several milliseconds and several hundred milliseconds, and the image frame number interval can be between 0 frame and dozens of frames. The features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames.

In order to obtain accurate localization, there are multiple matching features in general, for example, more than 10 matching features. Thus, the processing device 15 seeks matching features from the identified features based on the positions of the identified features in respective image frames. For example, refer to FIG. 2 which shows a schematic diagram of a change in relationship between the positions of the matching features in two image frames acquired at time t1 and time t2. After the features in image frames are identified, the processing device 15 determines that an image frame P1 contains features a1 and a2, an image frame P2 contains features b1, b2 and b3. Meanwhile, the feature a1 and the features b1 and b2 all belong to the same feature, and the feature a2 and the feature b3 belong to the same feature. The processing device 15 determines that the feature a1 in the image frame P1 is located on the left of the feature a2 and the spacing therebetween is d1 pixel point. The processing device 15 determines that the feature b1 in the image frame P2 is located on the left of the feature b3 and the spacing therebetween is d1' pixel point, and the feature b2 is located on the right of the feature b3 and the spacing therebetween is d2' pixel point. And then the processing device 15 matches the position relationship between the feature b1 and the feature b3, and the position relationship between the feature b2 and the feature b3 with the position relationship between the feature a1 and the feature a2 respectively, and matches the pixel spacing between the feature b1 and the feature b3, and the pixel spacing between the feature b2 and the feature b3 with the pixel spacing between the feature a1 and the feature a2 respectively. Based on the matching results, the processing device 15 determines that the feature a1 in the image frame P1 matches with the feature b1 in the image frame P2, and the feature a2 matches with the feature b3. By that analogy, the processing device 15 can match all features and localize the position and pose of the robot based on the change in image pixels position corresponding to the feature. Wherein, the position of the robot can be obtained according to the displacement change in a two-dimensional plane, and the pose can be obtained according to the angle change in the two-dimensional plane.

Here, the processing device 15 can determine the image position offset information about a plurality of features in two image frames or determine the physical position offset information about the plurality of features in the physical space according to the corresponding relationship, and compute the relative position and pose of the robot from the time t1 to the time t2 by synthesizing any one of the obtained position offset information. For example, through coordinate transformation, the processing device 15 determines that the position and pose of the robot from the time t1 at which the image frame P1 is obtained to the time t2 at which the image frame P2 is obtained is: moving m length over a surface and rotating n degree to the left. By taking a cleaning robot as an example, when the cleaning robot already creates a map, it can help the robot determine whether it is on a planned route according to the position and pose obtained by the processing device 15. When the cleaning robot does not create a map, it can help the robot determine the relative displacement and the relative rotating angle according to the position and pose obtained by the processing device 15, and draw the map by means of the data.

The processing device 15 is further configured to invoke the localization and mapping application to execute the following steps: acquiring at least one image, determining the position of flexible obstacle in the at least one image based on the positions of features in the at least one image, and determining the size information of the flexible obstacle based on the standard measure in the at least one image.

The processing device 15 can use image identification method such as the image identification method based on a convolutional neural network and the image identification method based on a wavelet moment to process, analyze and understand the images captured by the image acquisition device 13, so as to identify various modes of targets and objects. In addition, the processing device can seek similar image objects through analyzing the corresponding relationship, similarities and consistencies of image contents, features, structures, relations, textures and gray scales.

In one embodiment, with a cleaning robot as an example, since the cleaning robot often performs indoor cleaning, objects contained in the images captured by the image acquisition device generally includes a wall, a table, a sofa, a wardrobe, a television, a power socket, and a cable socket, and so on. In the example, firstly, the image acquisition device 13 captures images under a navigation operating environment of the cleaning robot and then provides the capture images to the processing device 15. The processing device 15 identifies the pattern of an object in the captured images through image identification. Wherein the pattern of the object can be characterized by the feature such as gray scale of the object and contour of the object. Meanwhile, the pattern of the object are not limited to external geometric figure of the object, and can also include other graphic patterns shown on the objects, such as a two-holes on a power socket, a five-holes on a power socket, or a square hole on a cable socket. In view of this, for example, for a power socket and a cable socket with similar external geometric figures, the five-holes of a power socket and the square hole of a cable socket can be used for distinguishment. In addition, when the objects contained in the images captured by the image acquisition device of the cleaning robot include a power socket and a cable socket, since the power socket and the cable socket are designed according to the GB standard, they will not vary with the different environments in which they are located, thus they can be used as standard components. Standard physical features of standard component can include length, width and height of a power socket, and structural relationship of a five-holes on the power socket. In some implementations, the pattern of standard component and the standard physical features of standards component can be preset, and can be stored in the storage device of the robot in advance. Therefore, the manner of acquiring the standard physical feature of standard component includes reading preset standard physical feature from the storage device of the robot. Wherein the standard component can include the standard component which are designed based on at least one standard selected from the industrial standard, national standard, international standard and customized standard. For example, the industrial standard may be mechanical industry standard JB, building material industry standard JC, etc.; the national standard may be GB standard of China, DIN standard of Germany and BS standard of the UK, etc.; the international standard may be international ISO standard; and the customized standard will be described in detail below. The standard physical feature can include overall dimension, standard structural relationship, etc. For example, the standard physical features of a standard component include the actual physical length, width and height of the standard component, and other actual physical size data of corresponding standard in the standard component, for example, the spacing between two holes on a power socket, the length and width of the power socket, the length and width of a floor board or a floor tile, and the length, width and thickness of a carpet.

In addition, for the pattern of the object in the identified images and the pattern of a stored standard component, the processing device 15 determines whether the identified at least one pattern is corresponding to the pattern of the stored standard component through an analysis on the corresponding relationship, similarities and consistencies of image contents, features, structures, relations, textures and gray scales, and when the identified at least one pattern is corresponding to the pattern of the stored standard component, the standard physical features of the standard components can be obtained. Wherein the at least one pattern corresponding to the pattern of the stored standard component is called as a standard pattern. With a power socket as an example, the storage device 11 stores the pattern of a standard power socket, the processing device 15 determines whether the identified at least one pattern is corresponding to the pattern of the stored power socket through an analysis on the corresponding relationship, similarities and consistencies of image contents, features, structures, relations, textures and gray scales, and when the identified at least one pattern is corresponding to the pattern of the stored power socket, the standard physical features of the power socket can be obtained.

Therefore, based on the corresponding relationship between a preset unit pixel interval and the unit length in the actual physical space, and the size of the identified standard pattern and the real size of the corresponding standard physical features, the processing device 15 can calculate the position of the flexible obstacle contained in the image in the current physical space and the size information of the flexible obstacle. With the socket arranged on the wall as an example, when the processing device identifies the socket and the boundary between the wall and the ground, or identifies the socket and tacitly approves that the socket is installed on the wall, based on the above corresponding relationship, the processing device 15 can not only obtain the position of the flexible obstacle in the current physical space (for example, the distance and deflection angle between the flexible obstacle and the socket, the distance and deflection angle between the mobile robot and the socket, and the distance and deflection angle between the mobile robot and the flexible obstacle), but also obtain the size of flexible obstacle (for example, the length and thickness of flexible obstacle) and the area covered by flexible obstacle based on the space position relation of standard measure of a socket (for example, the length and width of the socket or the spacing between holes in a socket).

The processing device 15 is configured to invoke a simultaneous localization and mapping application and a behavior control application to control the behavior of the mobile robot. In the present application, the behavior control application indicates that the navigation of a mobile robot is controlled and the pose is adjusted based on the set information or instructions. The processing device 15 can control the movement system 17 of the mobile robot based on the behavior control application.

The movement system 17 is connected with the processing device 15, and is configured to drive the mobile robot to move based on the control instruction sent by the processing device 15. In actual implementations, the movement system 17 can include a travelling mechanism and a drive mechanism, wherein the travelling mechanism can be arranged at the bottom of the mobile robot, and the drive mechanism can be arranged inside the housing of the mobile robot. Further, the travelling mechanism can use walking wheel. In one implementation, the travelling mechanism can for example include at least two universal walking wheels, movement such as going forward, going backward, steering and rotating can be realized via the at least two universal walking wheels. In other implementations, the travelling mechanism can for example include the combination of two straight-going walking wheels and at least one auxiliary steering wheel, wherein when the at least one auxiliary steering wheel does not work, the two straight-going walking wheels are mainly used for going forward and backward, while when the at least one auxiliary steering wheel works with the two straight-going walking wheels, movement such as steering and rotating can be realized. The drive mechanism can be for example a drive motor, and the drive motor can be used to drive the walking wheels in the travelling mechanism to realize movement. In a specific implementation, the drive motor can be for example a reversible drive motor, and a gear shift mechanism can be arranged between the drive motor and the axle of a walking wheel.

As mentioned above, when identified flexible obstacle from the at least one image captured by the image acquisition device 13, the processing device 15 invokes a simultaneous localization and mapping application and a behavior control application from the storage device 11 to control the behaviors of the mobile robot. In view of the information such as the type, size and position of flexible obstacle and the position and pose of the mobile robot, the processing device 15 can use different ways to control the behaviors of the mobile robot, wherein the behaviors of the mobile robot can include, but are not limited to, the movement and pose of the mobile robot.

In some embodiments, the manner that the processing device 15 invokes a simultaneous localization and mapping application and a behavior control application to control the behaviors of the mobile robot can include: based on the information of flexible obstacle and the position and pose of the mobile robot, sending the control instruction to a movement system 17 to control the mobile robot to move according to the original navigation route and cross the flexible obstacle. Specifically, if the processing device 15 identifies the flexible obstacle, and when determining that the flexible obstacle will not interfere with normal operation of the mobile robot based on the information such as type, size and/or position of the flexible obstacle, the processing device 15 sends the control instruction to the movement system 17 to control the mobile robot to move according to the original navigation route and cross the flexible obstacle. With the cleaning robot as an example, in one example, if the flexible obstacle contained in one image is identified to be cable or rope, and the cable or rope has smaller diameter and is placed regularly, or if the flexible obstacle contained in the image is identified to be leftover of cloth with a greater size and the leftover of cloth is paved on the ground, the processing device 15 can control the cleaning robot to move according to the original navigation route and cross the flexible obstacle. Wherein, in the process of controlling the cleaning robot to move according to the original navigation route, multiple implementations can be used. In one implementation, controlling the cleaning robot to move according to the original navigation route indicates controlling the cleaning robot to move according to the original navigation route at the original moving speed and the original pose. In another implementation, controlling the cleaning robot to move according to the original navigation route indicates controlling the cleaning robot to change the original moving speed and move according to the original navigation route at the changed moving speed and the original pose, herein, changing the original moving speed can include increasing or reducing the moving speed. In still another implementation, controlling the cleaning robot to move according to the original navigation route indicates controlling the cleaning robot to change the moving speed and the pose, and move according to the original navigation route at the changed moving speed and the changed pose, herein, changing the original moving speed can include increasing or reducing the moving speed.

In some embodiments, the manner that the processing device 15 invokes a simultaneous localization and mapping application and a behavior control application to control the behaviors of the mobile robot can include: based on the information of flexible obstacle and the position and pose of the mobile robot, sending the control instruction to a movement system 17 to control the mobile robot to modify the original navigation route, move according to the modified navigation route and cross the flexible obstacle. Specifically, if the processing device 15 identifies the flexible obstacle, and when determining that the flexible obstacle will probably interfere with normal operation of the mobile robot in the original navigation route but can be avoided through changing the original navigation route based on the information such as type, size and/or position of the flexible obstacle, the processing device 15 sends the control instruction to the movement system 17 to control the mobile robot to modify the original navigation route, move according to the modified navigation route and cross the flexible obstacle. With the cleaning robot as an example, in one example, if identified that the placement of the flexible obstacle contained in the image may possibly interfere with normal operation of the mobile robot (for example, the placement in the length direction of the cable, rope or thread residue is basically consistent with the original navigation route, or the cable, rope, thread residue or ribbon is just located below the walking wheel or at the inlet of the dust collection under the original navigation route), the processing device 15 can control the cleaning robot to modify the original navigation route, move according to the modified navigation route and cross the flexible obstacle. For example, the processing device 15 can modify the original navigation route to make the modified navigation route being vertical to the placement of the flexible obstacle, and then, control the cleaning robot to cross the flexible obstacle. Or the processing device 15 can modify the original navigation route, so that when the cleaning robot crosses the flexible obstacle, the flexible obstacle will not be located below the wheel or inlet of the dust collection under the new navigation route. Wherein in the process in which the cleaning robot is controlled to modify the original navigation route and move according to the modified navigation route, the moving speed of the cleaning robot can be implemented in different ways, that is, the moving speed can be unchanged, or can be increased or reduced.

In some embodiments, the manner that the processing device 15 invokes a simultaneous localization and mapping application and a behavior control application to control the behaviors of the mobile robot can include: based on the information of flexible obstacle and the position and pose of the mobile robot, sending the control instruction to a movement system 17 to control the mobile robot to modify the original navigation route, move according to the modified navigation route to avoid the flexible obstacle. Specifically, if the processing device 15 identifies the flexible obstacle, and when determining that the flexible obstacle will probably interfere with normal operation of the mobile robot based on the information such as type, size and/or position of the flexible obstacle, the processing device 15 sends the control instruction to the movement system 17 to control the mobile robot to modify the original navigation route, move according to the modified navigation route to avoid the flexible obstacle. With the cleaning robot as an example, in one example, if identified that the flexible obstacle contained in the image is cable, rope or leftover of cloth, and the cable or rope is placed irregularly, or if identified that the flexible obstacle contained in the image is cable or rope with greater size, or if identified that the flexible obstacle contained in the image is thread residue or ribbon, the processing device 15 can control the cleaning robot to modify the original navigation route, move according to the modified navigation route to avoid the flexible obstacle.

In some embodiments, the manner that the processing device 15 invokes a simultaneous localization and mapping application and a behavior control application to control the behaviors of the mobile robot can include: based on the information of flexible obstacle and the position and pose of the mobile robot, sending the control instruction to a movement system 17 to control the mobile robot to stop moving. Specifically, if the processing device 15 identifies the flexible obstacle, and when determining that the flexible obstacle will probably interfere with normal operation of the mobile robot or when failing to determine the interference degree of the flexible obstacle on normal operation of the mobile robot effectively based on the information such as type, size and/or position of the flexible obstacle, the processing device 15 sends the control instruction to the movement system 17 to control the mobile robot to stop moving. In actual applications, the following setting can also be made: once identified that flexible obstacle contains in the image, the control instruction can be directly sent to the movement system 17 to control the mobile robot to stop moving without performing the operation such as calculation and determination of the information including size and placement of flexible obstacle.

In addition, in some embodiments, the manner that the processing device 15 invokes a simultaneous localization and mapping application and a behavior control application to control the behaviors of the mobile robot can include: based on the information of flexible obstacle and the position and pose of the mobile robot, and sending the control instruction to the movement system 17 to control the mobile robot to move according to the original navigation route without considering the flexible obstacle. Specifically, if the processing device 15 identifies the flexible obstacle, and when determining that the flexible obstacle is not on the original navigation route based on the information such as type, size and/or position of the flexible obstacle, the processing device 15 sends the control instruction to the movement system 17 to control the mobile robot to move according to the original navigation route. With the cleaning robot as an example, in one example, if identified that the flexible obstacle contained in the image is cable or rope, and the cable or rope is arranged close to the corner of the wall, or if identified that the flexible obstacle contained in the image is thread residue, scarves or leftover of cloth, and the thread residue, scarves or leftover of cloth is located below a table or a sofa while the cleaning of the table or sofa is not included in the navigation route, the processing device 15 can control the cleaning robot to move according to the original navigation route and ignore the flexible obstacle.

The mobile robot of the present application can further include an alarm device (not shown in the figure), the alarm device is connected with the processing device 15, and is configured to output alarm information when the processing device 15 identified that the image contains flexible obstacle. Specifically, if the processing device 15 identified that the image contains flexible obstacle, the processing device 15 sends the control instruction to the alarm device to control the alarm device to output the alarm information. The alarm device and the alarm information output by the alarm device can be implemented in multiple ways or in the combination thereof. In one implementation, the alarm device can be for example a buzzer, and the buzzer sends out sound when the processing device 15 identified that the image contains flexible obstacle. In another implementation, the alarm device can be for example an alarm light, the alarm light emits light when the processing device 15 identified that the image contains flexible obstacle, and the light can be always-on light or twinkling light. In still another implementation, the alarm device can be for example an information sending device, and the information sending device sends alarm information to a user terminal (for example, an smartphone) or an indoor intelligent terminal (for example, intelligent speaker, intelligent bulb, intelligent display screen, etc.) which is connected via a network when the processing device 15 identified that the image contains flexible obstacle. By utilizing the alarm device, the information of finding out flexible obstacle can be sent out immediately, such that operators can remove the flexible obstacle so as to remove obstacles.

As to the mobile robot of the present application, through the technical solution that under an operating mode of the mobile robot, acquiring image containing the ground, identifying the image, and controlling the behaviors of the mobile robot by invoked a simultaneous localization and mapping application and a behavior control application when identified that the image contains flexible obstacle, the flexible obstacle can be detected effectively, and the behaviors of the mobile robot can be controlled correspondingly based on the detected results.

Figure 6:
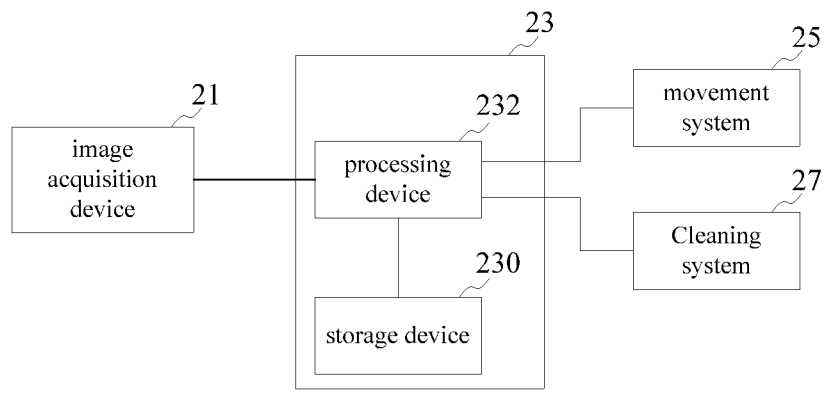
FIG. 6 is a structural schematic diagram of a cleaning robot of the present application in one embodiment.

Please refer to FIG. 6 which is a structural schematic diagram of a cleaning robot of the present application in one embodiment. As shown in FIG. 6, the cleaning robot includes an image acquisition device 21, a control system 23, a movement system 25 and a cleaning system 27, wherein the control system 23 further includes a storage device 230 and a processing device 232. The cleaning robot is one type of the mobile robot.

The image acquisition device 21 is configured to acquire images of the operating environment under an operating mode of the cleaning robot. The image acquisition device 21 includes, but is not limited to, a camera, a video camera, an image acquisition module integrated with an optical system or a CCD chip, and an image acquisition module integrated with an optical system and a CMOS chip. A power supply system of the image acquisition device 21 can be controlled by a power supply system of the cleaning robot. During movement of the cleaning robot when being powered on, the image acquisition device 21 starts to capture images and provides the images to the processing device 232. For example, the captured indoor images are cached in the storage device 230 in a preset video format by the image acquisition device of the cleaning robot and are acquired by the processing device 232. The image acquisition device 21 is configured to capture images during movement of the cleaning robot. Herein, in some embodiments, the image acquisition device 21 may be arranged at the top surface of the cleaning robot, for example, the image acquisition device in the cleaning robot may be arranged in the middle or at the edge of the top surface of the housing thereof. The angle between the optic axis of the field of view of the image acquisition device and the vertical line is ±30°. For example, the angle between the optic axis of the image acquisition device of the cleaning robot and the vertical line is −30°, −29°, −28°, −27° . . . −1°, 0°, 1°, 2° . . . 29° or 30°. In some embodiments, the image acquisition device 21 can be arranged at the junction of the top surface and a side surface of the cleaning robot. For example, at least one concave structure (the concave structure can be arranged at the front end, the rear end or the side end of the housing) is arranged at the junction of the top surface and the side surface of the housing of the cleaning robot, and the image acquisition device is arranged inside the concave structure. The angle α between the optic axis of the lens in the image acquisition device and the plane defined by the top surface of the housing (the plane defined by the top surface of the housing can be consistent with the horizontal plane, namely, when the cleaning robot is stably placed in a horizontal plane, the plane defined by the top surface of the housing is in parallel with the horizontal plane) is in a range from 61 to 85°, that is to say, the angle α between the optic axis of the lens in the image acquisition device and the plane defined by the top surface of the housing is 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°. The lens in the image acquisition device is designed to lean forward, so more environmental information can be captured by the lens. For example, compared with an image acquisition device with the lens facing upward vertically, the image acquisition device which is designed to lean forward can capture more environmental images in front of the cleaning robot, for example, part of the ground area in front of the cleaning robot. It should be noted that, those skilled in the art should understand that the angle between the optic axis and the vertical line or the top surface of the housing is only an example but not to limit the accuracy of the angle thereof within the range of 1°. The accuracy of the angle may be higher according to the actual design requirements of the cleaning robot, for example, more than 0.1°, 0.01° or the like. Endless examples will not be recited herein.

The storage device 230 stores a simultaneous localization and mapping application and a behavior control application.

The simultaneous localization and mapping application, namely, SLAM (Simultaneous Localization and Mapping) application, is a basic application in the field of intelligent robots. The localization technology of the cleaning robot can include a process in which the cleaning robot can determine its position and orientation (or pose) relative to its surroundings, and the cleaning robot which can build map about its surroundings can locate itself in the map, so as to show its degree of autonomy. The problem can be described as follows: when the cleaning robot is in an unknown environment, how would the cleaning robot can gradually describe a complete map of the environment on the one hand, and determine along which direction the cleaning robot should travel on the other hand, that is to say, in order to realize intelligence, three tasks need to be completed, firstly, localization, secondly, mapping, and thirdly, the subsequent navigation. The behavior control application in the present application indicates that the navigation of the cleaning robot is controlled and the orientation (or pose) is adjusted based on the set information or instructions. Herein, "pose" includes the position of the cleaning robot (for example, x coordinate and y coordinate) in the motion space, and angle orientation of the cleaning robot relative to the reference object (e.g., wall) or reference direction in the motion space. It should be noted that, in order to compensate the error of a map built based on an SLAM technology, a technology based on visual simultaneous localization and mapping (VSLAM) can compensate the errors of the movement information provided by the sensor based on image data provided by an image sensor, and can provide a more accurate navigation capability for the cleaning robot.

As a basic application in the field of intelligent robots, the behavior control application is associated with the processing device 232 and the movement system 25, such that the processing device 232 can control the movement system 25 by utilizing the behavior control application. In actual applications, the behavior control application can combine with the above SLAM application, based on the localization information and map information obtained through the SLAM application, the processing device 232 can send the control instruction and control the movement system 25 to execute corresponding behaviors. Herein, "behavior" includes the movement and pose of the cleaning robot.

In addition, the storage device 230 further stores standard physical features of at least one standard component. Wherein the standard component refers to the standard component which is designed based on at least one standard selected from the industrial standard, national standard, international standard and customized standard. For example, the industrial standard may be mechanical industry standard JB, building material industry standard JC, etc.; the national standard may be GB standard of China, DIN standard of Germany and BS standard of the UK, etc.; the international standard may be international ISO standard; and the customized standard will be described in detail below. The standard physical feature can include overall dimension, standard structural relationship, etc. For example, the standard physical features of a standard component include the actual physical length, width and height of a standard component, and other actual physical size data of corresponding standard in the standard component, for example, the spacing between two holes on a power socket, the length and width of the power socket, the length and width of a floor board or a floor tile, and the length, width and thickness of a carpet.

Herein, the storage device 230 includes, but is not limited to, a read-only memory (ROM), a random access memory (RAM), and a nonvolatile RAM (NVRAM), for example, one or more disc storage devices, flash memory devices or other non-volatile solid state storage devices. In some embodiments, the storage device 230 can include a storage away from one or more processors, for example, a network attached memory accessed via an RF circuit or an external port and a communication network (not shown). Wherein the communication network may be an Internet, one or more intranets, a local area network (LAN), a wireless local area network (WLAN), a storage area network (SAN) or an appropriate combination thereof. A memory controller may control the access of other assemblies of the cleaning robot such as a central processing unit (CPU) and a peripheral interface to the storage device.

The processing device 232 includes one or more processors. The processing device 232 is operably coupled to a read-only memory, a random access memory and/or a non-volatile memory in the storage device 230. The processing device 232 can execute instructions stored in the read-only memory, the random access memory and/or the non-volatile memory to execute operations in the robot, for example, extracting features in the images and performing localization in a map based on the features, or acquiring images and identifying the images. Therefore, the processor may include one or more general-purpose microprocessors, one or more application specific integrated circuits (ASIC), one or more digital signal processors (DSP), one or more field programmable gate arrays (FPGA) or any combination thereof. The processing device 232 is also operably coupled to an I/O port and an input structure, wherein the robot can interact with various other electronic apparatus by the I/O port, and the user can interact with a computing apparatus by the input structure. Therefore, the input structure may include a button, a keyboard, a mouse, a touchpad and the like. The other electronic apparatus may be a mobile motor in the movement device of the cleaning robot, or a slave processor dedicated to the control of the movement device and the cleaning device in the cleaning robot, for example, a microcontroller unit (MCU).

In an example, the processing device 232 is connected with the storage device 230 and the image acquisition device 21 respectively through data cables. The processing device 232 interacts with the storage device 230 through a data read-write technology, and the processing device 232 interacts with the image acquisition device 21 through an interface protocol, wherein the data read-write technology includes, but is not limited to, a high-speed/low-speed data interface protocol, a database read-write operation and the like. The interface protocol includes, but is not limited to, an HDMI interface protocol, a serial interface protocol and the like.

The processing device 232 is configured to control the image acquisition device to capture pictures in order to acquire images containing the ground under an operating mode of the cleaning robot, and invoke a simultaneous localization and mapping application and a behavior control application to control the behaviors of the cleaning robot when identified that the image contains flexible obstacle.

The processing device 232 is configured to acquire at least one image from the images captured by the image acquisition device 21, and identify the at least one image to detect whether the at least one image contains flexible obstacle.

As mentioned above, generally speaking, when a cleaning robot moves on an operating plane (for example, the ground) under an operating mode, flexible obstacles on the ground may be mis-detected. Therefore, in the present application, under an operating mode of the cleaning robot, the image acquisition device 21 can be controlled to capture images containing the ground, and the "ground" herein can be specifically the surface to which the cleaning robot will move subsequently according to a travelling path.

The identification of flexible obstacles in the at least one image is realized by utilizing a flexible obstacle image classifier, that is, during identification, the images to be identified are input into the flexible obstacle image classifier and then identified results can be output. In the present embodiment, the flexible obstacle image classifier include a trained convolutional neural network.

In some embodiments, the process of training can include: firstly, the step of making the training sample sets, wherein, the training samples can include images containing flexible obstacles conforming to preset rules. And then, the step of training based on the training sample sets so as to obtain a flexible obstacle image classifier. Here, when making the training sample sets, in one implementation, images of flexible obstacles conforming to preset rules can be collected automatically, for example, images of related flexible obstacles can be searched from the network or images of related flexible obstacles can be captured automatically, and images of typical flexible obstacles conforming to preset rules are selected from the above-mentioned images to serve as training samples. While in other implementations, part or all of the images of flexible obstacles selected from the existing standard library of various flexible obstacles can be served as training samples, for example, part or all of the images of flexible obstacles can be selected from different standard libraries of flexible obstacles respectively, and the selected images can be combined to form training sample sets, or, at least one standard library is selected from different standard libraries of flexible obstacles, and part or all of the images in the selected at least one standard library are determined to be training sample sets. Herein, the images containing flexible obstacles which serve as training samples can be simple images with a single background (for example, the background can be of a single pure color) or can be images under an environmental background. Since in the present application, the images captured by the image acquisition device 21 under the control of the cleaning robot are images containing the ground, the images serving as training samples can be ground images containing the flexible obstacles. As to specific flexible obstacles, in the present application, the flexible obstacles include, but are not limited to, the following types: cables, ropes, ribbons, shoelaces, towels, leftover of cloth, cotton fibres, and plant vines. As to the ground, based on the applied environment, the ground includes, but is not limited to, the following types: cement ground, varnished ground, ground paved with laminate flooring, ground paved with solid wood flooring, and ground paved with carpets. Therefore, for specific flexible obstacles, corresponding training sample sets can be made, that is, the following training sample sets can be made: a cable training sample set corresponding to cables (for example, images of various cables shown in different forms on different grounds), a rope training sample set corresponding to ropes (for example, images of various ropes shown in different forms on different grounds), a ribbon training sample set corresponding to ribbons (for example, images of various ribbons shown in different forms on different grounds), a training sample set of the leftover of cloth corresponding to the leftover of cloth (for example, images of various leftover of cloth shown in different forms on different grounds), a cotton fibre training sample set corresponding to cotton fibres (for example, images of various cotton fibres shown in different forms on different grounds), and a plant vine training sample set corresponding to plant vines (for example, images of various plant vines shown in different forms on different grounds), and so on. In addition, before the training sample set is trained, images in the training sample set can be preprocessed correspondingly. In some embodiments, the preprocess includes, but is not limited to, performing tailoring, compressing, grayscale processing, image filtering and/or noise filtering on the images in the training sample set.

In some embodiments, the process of training can include: firstly, the step of making the training sample sets, wherein, the training samples can include images containing flexible obstacles conforming to preset rules which serve as positive samples, and images containing no flexible obstacles or images containing flexible obstacles not conforming to preset rules which serve as negative samples. And then, the step of training based on the training sample sets so as to obtain a flexible obstacle image classifier. Here, with respect to the step of collecting the images containing flexible obstacles conforming to preset rules as positive samples, in one implementation, images of flexible obstacles conforming to preset rules can be collected automatically, for example, images of related flexible obstacles are searched from the network or images of related flexible obstacles are captured automatically, and images of typical flexible obstacles conforming to preset rules are selected therefrom to serve as positive samples. While in other implementations, part or all of the images of flexible obstacles selected from the existing standard library of various flexible obstacles can be served as positive samples, for example, part or all of the images of flexible obstacles can be selected from different standard libraries of flexible obstacles and the selected images can be combined to form a positive sample set, or, at least one standard library is selected from different standard libraries of flexible obstacles, and part or all of the images in the selected at least one standard library are determined to be positive samples. Herein, the images containing flexible obstacles which serve as positive samples can be simple images with a single background (for example, the background can be of a single pure color) or can be images under an environmental background. Since in the present application, the images captured by the image acquisition device 21 under the control of the cleaning robot are images containing the ground, the images serving as positive samples can be ground images containing the flexible obstacles. As to specific flexible obstacles, in the present application, the flexible obstacles can include, but are not limited to, the following types: cables, ropes, ribbons, shoelaces, towels, leftover of cloth, cotton fibres, and plant vines. As to the ground, based on the applied environment, the ground includes, but is not limited to, the following types: cement ground, varnished ground, ground paved with laminate flooring, ground paved with solid wood flooring, and ground paved with carpets. Therefore, for specific flexible obstacles, corresponding positive samples can be made, that is, the following positive sample sets can be made: a cable positive sample set corresponding to cables (for example, images of various cables shown in different forms on different grounds), a rope positive sample set corresponding to ropes (for example, images of various ropes shown in different forms on different grounds), a ribbon positive sample set corresponding to ribbons (for example, images of various ribbons shown in different forms on different grounds), a positive sample set of leftover of cloth corresponding to leftover of cloth (for example, images of various leftover of cloth shown in different forms on different grounds), a cotton fibre positive sample set corresponding to cotton fibres (for example, images of various cotton fibres shown in different forms on different grounds), and a plant vine positive sample set corresponding to plant vines (for example, images of various plant vines shown in different forms on different grounds), and so on. With respect to the step of collecting the images containing no flexible obstacles or images containing flexible obstacles not conforming to preset rules as negative samples, in one implementation, images containing no flexible obstacles or containing flexible obstacles not conforming to preset rules can be collected automatically, for example, related images containing no flexible obstacles or images containing flexible obstacles not conforming to preset rules are searched from the network, or images containing no flexible obstacles or images containing flexible obstacles not conforming to preset rules are captured automatically, and images containing no flexible obstacles or images containing flexible obstacles not conforming to preset rules are selected therefrom to serve as negative samples. While in other implementations, part or all of the images selected from the existing various standard libraries containing no flexible obstacles can be served as negative samples, for example, part or all of the images are selected from different standard libraries containing no flexible obstacles respectively, and the selected images are combined to form negative sample sets, or, at least one standard library is selected from different standard libraries containing no flexible obstacles, and part or all of the images in the selected at least one standard library are determined to be negative samples. As to specific flexible obstacles, in the present application, the flexible obstacles can include, but are not limited to, the following types: cables, ropes, ribbons, shoelaces, towels, leftover of cloth, cotton fibres, and plant vines. As to the ground, based on the applied environment, the ground includes, but is not limited to, the following types: cement ground, varnished ground, ground paved with laminate flooring, ground paved with solid wood flooring, and ground paved with carpets. Therefore, for specific flexible obstacles, corresponding negative sample sets can be made, that is, the following negative sample sets can be made: a cable negative sample set corresponding to cables (for example, images containing no cables or images containing cables not conforming to preset rules on different grounds), a rope negative sample set corresponding to ropes (for example, images containing no ropes or images containing ropes not conforming to preset rules on different grounds), a ribbon negative sample set corresponding to ribbons (for example, images containing no ribbons or images containing ribbons not conforming to preset rules on different grounds), a negative sample set of leftover of cloth corresponding to leftover of cloth (for example, images containing no leftover of cloth or images containing leftover of cloth not conforming to preset rules on different grounds), a cotton fibre negative sample set corresponding to cotton fibres (for example, images containing no cotton fibres or images containing cotton fibres not conforming to preset rules on different grounds), and a plant vine negative sample set corresponding to plant vines (for example, images containing no plant vines or images containing plant vines not conforming to preset rules on different grounds), and so on. In addition, before the training sample set is trained, images in the training sample set can be preprocessed. In some embodiments, the preprocess includes, but is not limited to, performing intercepting, compressing, grayscale processing, image filtering and/or noise filtering on the images in the training sample set.

Next, a flexible obstacle image classifier obtained through training can be used to identify images. In the present application, during image identification, the images to be identified are input into the flexible obstacle image classifier, and then the flexible obstacle image classifier outputs corresponding identified results. In some embodiments, the identification of images by the flexible obstacle image classifier can at least include the following steps: performing image preprocessing on the images to be identified; performing feature extraction on the preprocessed images; and inputting the features of the images to be identified into the flexible obstacle image classifier to obtain identified results.

Wherein, the step of performing image pre-processing on the images to be identified includes, but is not limited to, performing tailoring, compressing, grayscale processing and thresholding processing on the images to be identified. In addition, the pre-processing can also include image filtering, noise filtering, etc. With grayscale processing and thresholding processing as examples, grayscale processing is performed on the images to be identified to obtain grayscale images, and thresholding processing is performed on the grayscale images (for example, the grayscale images after binarization processing can be converted into binary images which can reflect overall and local features of images, namely black-and-white images). The step of performing feature extraction on the preprocessed images includes, but is not limited to, extracting contour features and textual features of images to be identified.

It should be noted that, in some embodiments, the above flexible obstacle image classifier used for identifying flexible obstacles can be pre-stored in a storage device 230. In one implementation, before the cleaning robot is sold to a terminal user (for example, before the cleaning robot is manufactured for delivery, or before the cleaning robot is distributed to each point of sells, or before the cleaning robot is sold to a terminal user at the point of sells), the flexible obstacle image classifier is written into the storage device 230. Generally, the flexible obstacle image classifier can be set with a permission, based on which the terminal users are forbidden from modifying the flexible obstacle image classifier. However, the flexible obstacle image classifier is not limited to what is described here. For example, the flexible obstacle image classifier can also open part or all of the permissions, and allow the terminal user to modify (for example, modification or adding or deleting operation). Or, the flexible obstacle image classifier can perform update operations after the cleaning robot is connected to a network and is in communication connection with the corresponding manufacturer server or application service provider server. In other implementations, the flexible obstacle images can be stored in a cloud system which is in remote communication with the cleaning robot, therefore, during image identification, the processing device 232 can acquire at least one image from the images captured by the image acquisition device 21 and send the at least one image to the cloud system which is in remote communication with the cleaning robot, and the flexible obstacle image classifier in the cloud system identifies the at least one image and sends the identified results to the cleaning robot in a remote manner.

Therefore, through the technical solution in which the processing device 232 is used to acquire at least one image from the images captured by the image acquisition device 21, and a flexible obstacle image classifier is used to identify the at least one image, whether the at least one image contains flexible obstacle can be detected, and the specific type of the existing flexible obstacles can be obtained.

The processing device 232 is further configured to invoke the simultaneous localization and mapping application and the behavior control application from the storage device 230 to control the behaviors of the cleaning robot when identified that the image contains flexible obstacle.

The processing device 232 is configured to invoke the localization and mapping application to execute the following steps: acquiring positions of matching features in at least two images, and determining the position and pose of the cleaning robot based on the corresponding relationship between an image coordinate system and a physical space coordinate system and based on the positions of matching features, wherein, the at least two images contains an image at the previous time and an image at the current time. In addition, for example, the physical space coordinate system can be camera coordinate system or world coordinate system.

In the present application, the storage device 230 stores the corresponding relationship between an image coordinate system and a physical space coordinate system. Wherein, the image coordinate system is created based on image pixel points, and two-dimensional coordinate parameters of image pixel points in the image captured by the image acquisition device 21 can be described by the image coordinate system. The image coordinate system can be a rectangular coordinate system, a polar coordinate system or the like. For the physical space coordinate system, i.e., a coordinate system created based on each position in an actual two-dimensional or three-dimensional physical space, the physical space position thereof can be described in the physical space coordinate system according to the corresponding relationship between a preset image pixel unit and a unit length (or a unit angle). The physical space coordinate system can be a two-dimensional rectangular coordinate system, a polar coordinate system, a spherical coordinate system, a three-dimensional rectangular coordinate system or the like. For example, the physical space coordinate system can be camera coordinate system or world coordinate system.

For a cleaning robot used in a scenario where the surface (e.g., ground) complexity is not high, the corresponding relationship can be pre-stored in the storage device before delivery. However, for a cleaning robot used in a scenario where the surface complexity is high, the corresponding relationship can be obtained by performing field test on the site used and then stored in the storage device 230. In some embodiments, the cleaning robot further includes a movement sensing device (not shown in the figure) used to acquire movement information about the robot. Wherein, the movement sensing device includes but is not limited to: a displacement sensor, a gyroscope, a speed sensor, a ranging sensor, an optical floor tracking sensor and a cliff sensor. During movement of the robot, the movement sensing device continuously senses movement information and provides the movement information for the processing device. The displacement sensor, the gyroscope, the optical floor tracking sensor and the speed sensor can be integrated in one or more chips. The ranging sensor and a cliff sensor can be arranged at the side of the robot. For example, the ranging sensor in the cleaning robot is arranged at the edge of a housing; and the cliff sensor in the cleaning robot is arranged at the bottom of the robot. According to the type and number of the sensors arranged in the robot, the movement information acquired by the processing device includes but is not limited to: displacement information, angle information, information about distance between robot and an obstacle, velocity information and advancing direction information.

To create the corresponding relationship, in some embodiments, the cleaning robot includes initialization device (not shown in the figure). The initialization device creates the corresponding relationship based on the positions of the matching features in two image frames and the movement information acquired from the previous time to the current time. Here, the initialization device can be a program module, wherein, the program thereof is stored in the storage device, and is executed via the invoking of the processing device. If the corresponding relationship is not stored in the storage device, the initialization device is invoked by the processing device to create the corresponding relationship.

Herein, during the movement of the robot, the initialization device acquires the movement information provided by the movement sensing device and each image provided by the image acquisition device 21. To reduce the accumulative errors of the movement sensing device, the initialization device can acquire the movement information and at least two image frames within a small period of time during which the robot moves. For example, the initialization device acquires the movement information and at least two image frames when monitoring that the robot moves in a straight line. And for example, the initialization device acquires the movement information and at least two image frames when monitoring that the robot moves angularly. Wherein, the time interval between acquiring at least two images when the robot moves angularly can be shorter than the time interval between acquiring at least two images when the robot moves in a straight line.

Then, the initialization device identifies and matches features in all images, and obtains image positions of the matching features in each image. Wherein, the features include but are not limited to corner features, edge features, line features and curve features. For example, the initialization device can acquire the image positions of the matching features using the tracking device (not shown in the figure). The tracking device is used to track positions of corresponding features (corresponding visual features) contained in two image frames.

The initialization device creates the corresponding relationship according to the image positions and the physical space position provided via the movement information. Here, the initialization device can create the corresponding relationship by creating feature coordinate parameters of the physical space coordinate system and the image coordinate system. For example, the initialization device can create the corresponding relationship between the physical space coordinate system and image coordinate systems by taking the physical space position where the image captured at the previous time as the origin of the physical space coordinate system and corresponding the coordinate origin to the positions of the matching features of the images in the image coordinate system.

It should be noted that the working process of the initialization device can be executed based on the instruction of a user or is transparent to the user. For example, the execution process of the initialization device is started on the basis that the corresponding relationship is not stored in the storage device 230 or the corresponding relationship is required to be updated. It will not be limited herein.

The corresponding relationship can be stored in the storage device in the manner such as programs corresponding algorithms, databases or the like. Thus, the software assembly stored in the storage includes an operating system, a communication module (or an instruction set), a contact/motion module (or an instruction set), a pattern module (or an instruction set), and an application (or an instruction set). In addition, the storage device further stores temporary data or persistent data including images captured by the image acquisition device, and the positions and poses obtained when the processing device performs localization computation.

After the corresponding relationship is created, the processing device acquires a matching feature in the image at the current time and the matching feature in the image at the previous time, and determines the position and pose of the robot according to the corresponding relationship and the features. Wherein, the matching feature in this application is an image feature which is in different images and conforms to preset matching degree. That is, the manner of acquiring a matching feature in the image at the current time and the matching feature in the image at the previous time is the manner of acquiring a visual feature in an image at the current time and the corresponding visual feature in an image at the previous time, wherein, the visual feature and the corresponding visual feature are called matching feature both.

Herein, the processing device 232 can acquire an image frame at the previous time t1 and an image frame at current time t2 according to a preset time interval or image frame number interval, and identify and match the features in two image frames. Wherein, according to the design of processing capabilities of hardware and software, the time interval can be between several milliseconds and several hundred milliseconds, and the image frame number interval can be between 0 frame and dozens of frames. The features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames.

In order to obtain accurate localization, there are multiple matching features in general, for example, more than 10 matching features. Thus, the processing device 232 seeks matching features from the identified features based on the positions of the identified features in respective image frames. For example, refer to FIG. 2 which shows a schematic diagram of a change in relationship between the positions of the matching features in two image frames acquired at time t1 and time t2. After the features in image frames are identified, the processing device 232 determines that an image frame P1 contains features a1 and a2, an image frame P2 contains features b1, b2 and b3. Meanwhile, the feature a1 and the features b1 and b2 all belong to the same feature, and the feature a2 and the feature b3 belong to the same feature. The processing device 232 determines that the feature a1 in the image frame P1 is located on the left of the feature a2 and the spacing therebetween is d1 pixel point. The processing device 232 determines that the feature b1 in the image frame P2 is located on the left of the feature b3 and the spacing therebetween is d1' pixel point, and the feature b2 is located on the right of the feature b3 and the spacing therebetween is d2' pixel point. And then the processing device 232 matches the position relationship between the feature b1 and the feature b3, and the position relationship between the feature b2 and the feature b3 with the position relationship between the feature a1 and the feature a2 respectively, and matches the pixel spacing between the feature b1 and the feature b3, and the pixel spacing between the feature b2 and the feature b3 with the pixel spacing between the feature a1 and the feature a2 respectively. Based on the matching results, the processing device 232 determines that the feature a1 in the image frame P1 matches with the feature b1 in the image frame P2, and the feature a2 matches with the feature b3. By that analogy, the processing device 232 can match all features and localize the position and pose of the robot based on the change in image pixels position corresponding to the feature. Wherein, the position of the robot can be obtained according to the displacement change in a two-dimensional plane, and the pose can be obtained according to the angle change in the two-dimensional plane.

Here, the processing device 232 can determine the image position offset information about a plurality of features in two image frames or determine the physical position offset information about the plurality of features in the physical space according to the corresponding relationship, and compute the relative position and pose of the robot from the time t1 to the time t2 by synthesizing any one of the obtained position offset information. For example, through coordinate transformation, the processing device 232 determines that the position and pose of the robot from the time t1 at which the image frame P1 is obtained to the time t2 at which the image frame P2 is obtained is: moving m length over a surface and rotating n degree to the left.

Thus, when the cleaning robot already creates a map, it can help the robot determine whether it is on a planned route according to the position and pose obtained by the processing device 232. When the cleaning robot does not create a map, it can help the robot determine the relative displacement and the relative rotating angle according to the position and pose obtained by the processing device 232, and draw the map by means of the data.

The processing device 232 is further configured to invoke the localization and mapping application to execute the following steps: acquiring at least one image, determining the position of flexible obstacle in the at least one image based on the positions of features in the at least one image, and determining the size information of the flexible obstacle based on the standard measure in the at least one image.

The processing device 232 can use image identification method such as the image identification method based on a convolutional neural network and the image identification method based on a wavelet moment to process, analyze and understand the images captured by the image acquisition device 21, so as to identify various modes of targets and objects. In addition, the processing device can seek similar image objects through analyzing the corresponding relationship, similarities and consistencies of image contents, features, structures, relations, textures and gray scales.

In one embodiment, since the cleaning robot often performs indoor cleaning, objects contained in the images captured by the image acquisition device generally includes a wall, a table, a sofa, a wardrobe, a television, a power socket, and a cable socket, and so on. In the example, firstly, the image acquisition device 21 captures images under a navigation operating environment of the cleaning robot and then provides the capture images to the processing device 232. The processing device 232 identifies the pattern of an object in the captured images through image identification. Wherein the pattern of the object can be characterized by the feature such as gray scale of the object and contour of the object. Meanwhile, the pattern of the object are not limited to external geometric figure of the object, and can also include other graphic patterns shown on the objects, such as a two-holes on a power socket, a five-holes on a power socket, or a square hole on a cable socket. In view of this, for example, for a power socket and a cable socket with similar external geometric figures, the five-holes of a power socket and the square hole of a cable socket can be used for distinguishment. In addition, when the objects contained in the images captured by the image acquisition device of the cleaning robot include a power socket and a cable socket, since the power socket and the cable socket are designed according to the GB standard, they will not vary with the different environments in which they are located, thus they can be used as standard components. Standard physical features of standard component can include length, width and height of a power socket, and structural relationship of a five-holes on the power socket. In some implementations, the pattern of standard component and the standard physical features of standards component can be preset, and can be stored in the storage device of the robot in advance. Therefore, the manner of acquiring the standard physical feature of standard component includes reading preset standard physical feature from the storage device of the robot. Wherein the standard component can include the standard component which are designed based on at least one standard selected from the industrial standard, national standard, international standard and customized standard. For example, the industrial standard may be mechanical industry standard JB, building material industry standard JC, etc.; the national standard may be GB standard of China, DIN standard of Germany and BS standard of the UK, etc.; the international standard may be international ISO standard; and the customized standard will be described in detail below. The standard physical feature can include overall dimension, standard structural relationship, etc. For example, the standard physical features of a standard component include the actual physical length, width and height of the standard component, and other actual physical size data of corresponding standard in the standard component, for example, the spacing between two holes on a power socket, the length and width of the power socket, the length and width of a floor board or a floor tile, and the length, width and thickness of a carpet.

In addition, for the pattern of the object in the identified images and the pattern of a stored standard component, the processing device 232 determines whether the identified at least one pattern is corresponding to the pattern of the stored standard component through an analysis on the corresponding relationship, similarities and consistencies of image contents, features, structures, relations, textures and gray scales, and when the identified at least one pattern is corresponding to the pattern of the stored standard component, the standard physical features of the standard components can be obtained. Wherein the at least one pattern corresponding to the pattern of the stored standard component is called as a standard pattern. With a power socket as an example, the storage device 230 stores the pattern of a standard power socket, the processing device 232 determines whether the identified at least one pattern is corresponding to the pattern of the stored power socket through an analysis on the corresponding relationship, similarities and consistencies of image contents, features, structures, relations, textures and gray scales, and when the identified at least one pattern is corresponding to the pattern of the stored power socket, the standard physical features of the power socket can be obtained.

Therefore, based on the corresponding relationship between a preset unit pixel interval and the unit length in the actual physical space, and the size of the identified standard pattern and the real size of the corresponding standard physical features, the processing device 232 can calculate the position of the flexible obstacle contained in the image in the current physical space and the size information of the flexible obstacle. With the socket arranged on the wall as an example, when the processing device identifies the socket and the boundary between the wall and the ground, or identifies the socket and tacitly approves that the socket is installed on the wall, based on the above corresponding relationship, the processing device 232 can not only obtain the position of the flexible obstacle in the current physical space (for example, the distance and deflection angle between the flexible obstacle and the socket, the distance and deflection angle between the cleaning robot and the socket, and the distance and deflection angle between the cleaning robot and the flexible obstacle), but also obtain the size of flexible obstacle (for example, the length and thickness of flexible obstacle) and the area covered by flexible obstacle based on the space position relation of standard measure of a socket (for example, the length and width of the socket or the spacing between holes in a socket).

The processing device 232 is configured to invoke a simultaneous localization and mapping application and a behavior control application to control the behavior of the cleaning robot. In the present application, the behavior control application indicates that the navigation of a cleaning robot is controlled and the pose is adjusted based on the set information or instructions. The processing device 232 can control the movement system 25 of the cleaning robot based on the behavior control application.

The movement system 25 is connected with the control system 23, and is configured to drive the cleaning robot to move based on the control instruction sent by the control system 23. In the embodiment, the movement system 25 is connected with the processing device 232 in the control system 23, and is configured to drive the cleaning robot to move based on a control instruction output by the processing device 232. In actual implementations, the movement system 25 can include a travelling mechanism and a drive mechanism, wherein the travelling mechanism can be arranged at the bottom of the cleaning robot, and the drive mechanism can be arranged inside the housing of the cleaning robot. Further, the travelling mechanism can use walking wheel. In one implementation, the travelling mechanism can for example include at least two universal walking wheels, movement such as going forward, going backward, steering and rotating can be realized via the at least two universal walking wheels. In other implementations, the travelling mechanism can for example include the combination of two straight-going walking wheels and at least one auxiliary steering wheel, wherein when the at least one auxiliary steering wheel does not work, the two straight-going walking wheels are mainly used for going forward and backward, while when the at least one auxiliary steering wheel works with the two straight-going walking wheels, movement such as steering and rotating can be realized. The drive mechanism can be for example a drive motor, and the drive motor can be used to drive the walking wheels in the travelling mechanism to realize movement. In a specific implementation, the drive motor can be for example a reversible drive motor, and a gear shift mechanism can be arranged between the drive motor and the axle of a walking wheel.

The cleaning system 27 is connected with the control system 23 and is configured to clean the ground based on control instruction output by the control system 23 during the movement of the mobile robot. In the present embodiment, the cleaning system 27 is connected with the processing device 232 in the control system 23 and is configured to clean the ground based on control instruction output by the processing device 232 during the movement of the mobile robot. In actual implementations, the cleaning system can at least include a sweeping component and a dust collection component. The sweeping component can include cleaning side brush arranged at the bottom of a housing and side brush motor which is configured to control the cleaning side brush, wherein there are at least two cleaning side brushes, and these two cleaning side brushes are symmetrically arranged at a front end of the housing, the cleaning side brushes can be rotary-type cleaning side brushes, and can rotate under the control of the side brush motor. The dust collection component can include a dust-collecting chamber and a vacuum cleaner, wherein the dust-collecting chamber is internally arranged in the housing, an air outlet of the vacuum cleaner is communicated with the dust-collecting chamber, and an air inlet of the vacuum cleaner is arranged at the bottom of the housing. However, the components of the cleaning system 27 are not limited to those described herein. In other embodiments, the cleaning system 27 can further include a floor-mopping device and a spraying device.

As mentioned above, when identified flexible obstacle from the at least one image captured by the image acquisition device 21, the processing device 232 invokes a simultaneous localization and mapping application and a behavior control application from the storage device 230 to control the behaviors of the cleaning robot. In view of the information such as the type, size and position of flexible obstacle and the position and pose of the cleaning robot, the processing device 232 can use different ways to control the behaviors of the cleaning robot, wherein the behaviors of the cleaning robot can include, but are not limited to, the movement and pose of the cleaning robot.

In some embodiments, the manner that the processing device 232 invokes a simultaneous localization and mapping application and a behavior control application to control the behaviors of the cleaning robot can include: based on the information of flexible obstacle and the position and pose of the cleaning robot, sending the control instruction to a movement system 25 to control the cleaning robot to move according to the original navigation route and cross the flexible obstacle. Specifically, if the processing device 232 identifies the flexible obstacle, and when determining that the flexible obstacle will not interfere with normal operation of the cleaning robot based on the information such as type, size and/or position of the flexible obstacle, the processing device 232 sends the control instruction to the movement system 25 to control the cleaning robot to move according to the original navigation route and cross the flexible obstacle. In one example, if the flexible obstacle contained in one image is identified to be cable or rope, and the cable or rope has smaller diameter and is placed regularly, or if the flexible obstacle contained in the image is identified to be leftover of cloth with a greater size and the leftover of cloth is paved on the ground, the processing device 232 can control the cleaning robot to move according to the original navigation route and cross the flexible obstacle. Wherein, in the process of controlling the cleaning robot to move according to the original navigation route, multiple implementations can be used. In one implementation, controlling the cleaning robot to move according to the original navigation route indicates controlling the cleaning robot to move according to the original navigation route at the original moving speed and the original pose. In another implementation, controlling the cleaning robot to move according to the original navigation route indicates controlling the cleaning robot to change the original moving speed and move according to the original navigation route at the changed moving speed and the original pose, herein, changing the original moving speed can include increasing or reducing the moving speed. In still another implementation, controlling the cleaning robot to move according to the original navigation route indicates controlling the cleaning robot to change the moving speed and the pose, and move according to the original navigation route at the changed moving speed and the changed pose, herein, changing the original moving speed can include increasing or reducing the moving speed.

In some embodiments, the manner that the processing device 232 invokes a simultaneous localization and mapping application and a behavior control application to control the behaviors of the cleaning robot can include: based on the information of flexible obstacle and the position and pose of the cleaning robot, sending the control instruction to a movement system 25 to control the cleaning robot to modify the original navigation route, move according to the modified navigation route and cross the flexible obstacle. Specifically, if the processing device 232 identifies the flexible obstacle, and when determining that the flexible obstacle will probably interfere with normal operation of the cleaning robot in the original navigation route but can be avoided through changing the original navigation route based on the information such as type, size and/or position of the flexible obstacle, the processing device 232 sends the control instruction to the movement system 25 to control the cleaning robot to modify the original navigation route, move according to the modified navigation route and cross the flexible obstacle. In one example, if identified that the placement of the flexible obstacle contained in the image may possibly interfere with normal operation of the cleaning robot (for example, the placement in the length direction of the cable, rope or thread residue is basically consistent with the original navigation route, or the cable, rope, thread residue or ribbon is just located below the walking wheel or at the inlet of the dust collection under the original navigation route), the processing device 232 can control the cleaning robot to modify the original navigation route, move according to the modified navigation route and cross the flexible obstacle. For example, the processing device 232 can modify the original navigation route to make the modified navigation route being vertical to the placement of the flexible obstacle, and then, control the cleaning robot to cross the flexible obstacle. Or the processing device 232 can modify the original navigation route, so that when the cleaning robot crosses the flexible obstacle, the flexible obstacle will not be located below the wheel or inlet of the dust collection under the new navigation route. Wherein in the process in which the cleaning robot is controlled to modify the original navigation route and move according to the modified navigation route, the moving speed of the cleaning robot can be implemented in different ways, that is, the moving speed can be unchanged, or can be increased or reduced.

In some embodiments, the manner that the processing device 232 invokes a simultaneous localization and mapping application and a behavior control application to control the behaviors of the cleaning robot can include: based on the information of flexible obstacle and the position and pose of the cleaning robot, sending the control instruction to a movement system 25 to control the cleaning robot to modify the original navigation route, move according to the modified navigation route to avoid the flexible obstacle. Specifically, if the processing device 232 identifies the flexible obstacle, and when determining that the flexible obstacle will probably interfere with normal operation of the cleaning robot based on the information such as type, size and/or position of the flexible obstacle, the processing device 232 sends the control instruction to the movement system 25 to control the cleaning robot to modify the original navigation route, move according to the modified navigation route to avoid the flexible obstacle. In one example, if identified that the flexible obstacle contained in the image is cable, rope or leftover of cloth, and the cable or rope is placed irregularly, or if identified that the flexible obstacle contained in the image is cable or rope with greater size, or if identified that the flexible obstacle contained in the image is thread residue or ribbon, the processing device 232 can control the cleaning robot to modify the original navigation route, move according to the modified navigation route to avoid the flexible obstacle.

In some embodiments, the manner that the processing device 232 invokes a simultaneous localization and mapping application and a behavior control application to control the behaviors of the cleaning robot can include: based on the information of flexible obstacle and the position and pose of the cleaning robot, sending the control instruction to a movement system 25 to control the cleaning robot to stop moving. Specifically, if the processing device 232 identifies the flexible obstacle, and when determining that the flexible obstacle will probably interfere with normal operation of the cleaning robot or when failing to determine the interference degree of the flexible obstacle on normal operation of the cleaning robot effectively based on the information such as type, size and/or position of the flexible obstacle, the processing device 232 sends the control instruction to the movement system 25 to control the cleaning robot to stop moving. In actual applications, the following setting can also be made: once identified that flexible obstacle contains in the image, the control instruction can be directly sent to the movement system 25 to control the cleaning robot to stop moving without performing the operation such as calculation and determination of the information including size and placement of flexible obstacle.

In addition, in some embodiments, the manner that the processing device 232 invokes a simultaneous localization and mapping application and a behavior control application to control the behaviors of the cleaning robot can include: based on the information of flexible obstacle and the position and pose of the cleaning robot, and sending the control instruction to the movement system 25 to control the cleaning robot to move according to the original navigation route without considering the flexible obstacle. Specifically, if the processing device 232 identifies the flexible obstacle, and when determining that the flexible obstacle is not on the original navigation route based on the information such as type, size and/or position of the flexible obstacle, the processing device 232 sends the control instruction to the movement system 25 to control the cleaning robot to move according to the original navigation route. In one example, if identified that the flexible obstacle contained in the image is cable or rope, and the cable or rope is arranged close to the corner of the wall, or if identified that the flexible obstacle contained in the image is thread residue, scarves or leftover of cloth, and the thread residue, scarves or leftover of cloth is located below a table or a sofa while the cleaning of the table or sofa is not included in the navigation route, the processing device 232 can control the cleaning robot to move according to the original navigation route and ignore the flexible obstacle.

The cleaning robot of the present application can further include an alarm device (not shown in the figure), the alarm device is connected with the processing device 232, and is configured to output alarm information when the processing device 232 identified that the image contains flexible obstacle. Specifically, if the processing device 232 identified that the image contains flexible obstacle, the processing device 232 sends the control instruction to the alarm device to control the alarm device to output the alarm information. The alarm device and the alarm information output by the alarm device can be implemented in multiple ways or in the combination thereof. In one implementation, the alarm device can be for example a buzzer, and the buzzer sends out sound when the processing device 232 identified that the image contains flexible obstacle. In another implementation, the alarm device can be for example an alarm light, the alarm light emits light when the processing device 232 identified that the image contains flexible obstacle, and the light can be always-on light or twinkling light. In still another implementation, the alarm device can be for example an information sending device, and the information sending device sends alarm information to a user terminal (for example, an smartphone) or an indoor intelligent terminal (for example, intelligent speaker, intelligent bulb, intelligent display screen, etc.) which is connected via a network when the processing device 232 identified that the image contains flexible obstacle. By utilizing the alarm device, the information of finding out flexible obstacle can be sent out immediately, such that operators can remove the flexible obstacle so as to remove obstacles.

As to the cleaning robot of the present application, through the technical solution that under an operating mode of the cleaning robot, acquiring image containing the ground, identifying the image, and controlling the behaviors of the cleaning robot by invoked a simultaneous localization and mapping application and a behavior control application when identified that the image contains flexible obstacle, the flexible obstacle can be detected effectively, and the behaviors of the cleaning robot can be controlled correspondingly based on the detected results.

Figure 7:
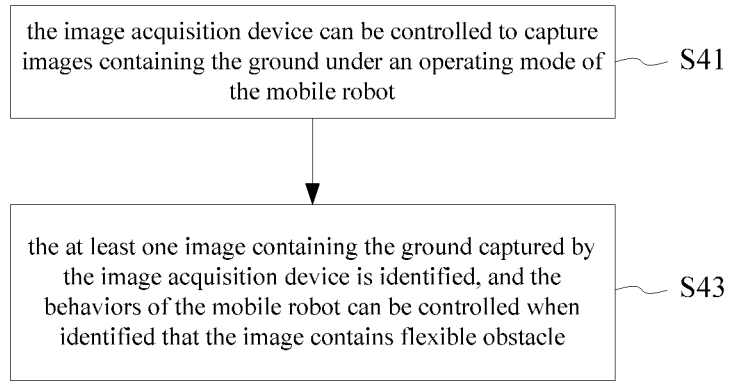
FIG. 7 is a flow diagram of the control method of the mobile robot of the present application in one embodiment.

Please refer to FIG. 7 which is a flow diagram of the control method of the mobile robot of the present application in one embodiment. The control method of the mobile robot of the present application is applied to the mobile robot, and the mobile robot includes an image acquisition device and a movement system. As shown in FIG. 7, the control method of the mobile robot of the present application includes the following steps:

Step 41, the image acquisition device can be controlled to capture images containing the ground under an operating mode of the mobile robot.

Herein, the image acquisition device can be used to acquire images of the navigation operating environment under an operating mode of the mobile robot. The image acquisition device includes, but is not limited to, a camera, a video camera, an image acquisition module integrated with an optical system or a CCD chip, and an image acquisition module integrated with an optical system and a CMOS chip. A power supply system of the image acquisition device can be controlled by a power supply system of the mobile robot. During movement of the mobile robot when being powered on, the image acquisition device starts to capture images.

In the present application, under an operating mode of the mobile robot, the image acquisition device can be controlled to capture images containing the ground, and the "ground" herein can be specifically the surface to which the mobile robot will move subsequently according to a travelling path. With the cleaning robot as an example, in some embodiments, the image acquisition device can be used to capture images of the ground in front of the travelling direction of the cleaning robot.

In addition, the image acquisition device can be arranged on the main body of the robot. With the cleaning robot as an example, the image acquisition device may be arranged at the top surface of the mobile robot, for example, taking the cleaning robot as an example, the image acquisition device in the cleaning robot may be arranged in the middle or at the edge of the top surface of the housing thereof. Please referring to FIG. 2, which is a schematic diagram of the cleaning robot equipped with the image acquisition device of the present application in one embodiment. As shown in FIG. 2, for example, the housing of the cleaning robot has a flat cylindrical structure, and the housing with the flat cylindrical structure includes a disk-shaped top surface and a side surface connected to the outer circumference of the top surface. The housing with the flat cylindrical structure has a better environmental adaptability when the cleaning robot moves (such forward, backward, steering, and rotation). In addition, the housing of the cleaning robot may has a rectangular column structure, a triangular prism structure, or a semi-elliptic cylindrical structure (also referred as a D-shaped structure). In FIG. 2, the arrow points to the forward direction of the cleaning robot. When the cleaning robot moves forward, the end of the housing that is closest to the forward direction is the front end (the end opposite to the front end is the rear end). In the cleaning robot shown in FIG. 2, the equipped image acquisition device 13 is arranged at the rear end of the top surface. The angle between the optic axis of the field of view of the image acquisition device and the vertical line is ±30°. In some embodiments, the image acquisition device can be arranged at the junction of the top surface and a side surface of the mobile robot. For example, at least one concave structure (the concave structure can be arranged at the front end, the rear end or the side end of the housing) is arranged at the junction of the top surface and the side surface of the housing of the cleaning robot, and the image acquisition device is arranged inside the concave structure. Please referring to FIG. 3, which is a schematic diagram of the cleaning robot equipped with the image acquisition device of the present application in another embodiment. As shown in FIG. 3, the image acquisition device 13 in this embodiment is arranged at the junction of the top surface and the side surface which is at the front end of the housing of the cleaning robot. The angle α between the optic axis of the lens in the image acquisition device and the plane defined by the top surface of the housing (the plane defined by the top surface of the housing can be consistent with the horizontal plane, namely, when the mobile robot is stably placed in a horizontal plane, the plane defined by the top surface of the housing is in parallel with the horizontal plane) is in a range from 61° to 85°. The lens in the image acquisition device is designed to lean forward, so more environmental information can be captured by the lens. For example, compared with an image acquisition device with the lens facing upward vertically, the image acquisition device which is designed to lean forward can capture more environmental images in front of the cleaning robot, for example, part of the ground area in front of the cleaning robot. In some embodiments, the image acquisition device 13 may be arranged at a side of the mobile robot, and the side may be a side at the front end, a side at the rear end, or a side at the side end. Please referring to FIG. 4, which is a schematic diagram of the cleaning robot equipped with the image acquisition device of the present application in yet another embodiment. As shown in FIG. 4, the image acquisition device 13 in this embodiment is arranged at the front end of the side surface. In addition, in order to protect the image acquisition device, as shown in FIG. 4, at least one concave structure can be arranged at front end of the side surface of the housing, and the image acquisition device 13 is disposed in the concave structure, such that the image acquisition device 13 cannot protrude from the front end of the side surface.

The navigation operating environment indicates the environment in which the mobile robot moves based on the navigation route designed based on the constructed map data or based on a randomly designed navigation route and performs corresponding operations. With the cleaning robot as an example, the navigation operating environment indicates the environment in which the cleaning robot moves based on the navigation route and performs cleaning operations.

Step S43, the at least one image containing the ground captured by the image acquisition device is identified, and the behaviors of the mobile robot can be controlled when identified that the image contains flexible obstacle.

In step S43, through identifying at least one image containing the ground, and when identified that the image contains flexible obstacle, the behaviors of the mobile robot can be controlled correspondingly based on the information of the flexible obstacle and the position information of the mobile robot.

Figure 8:
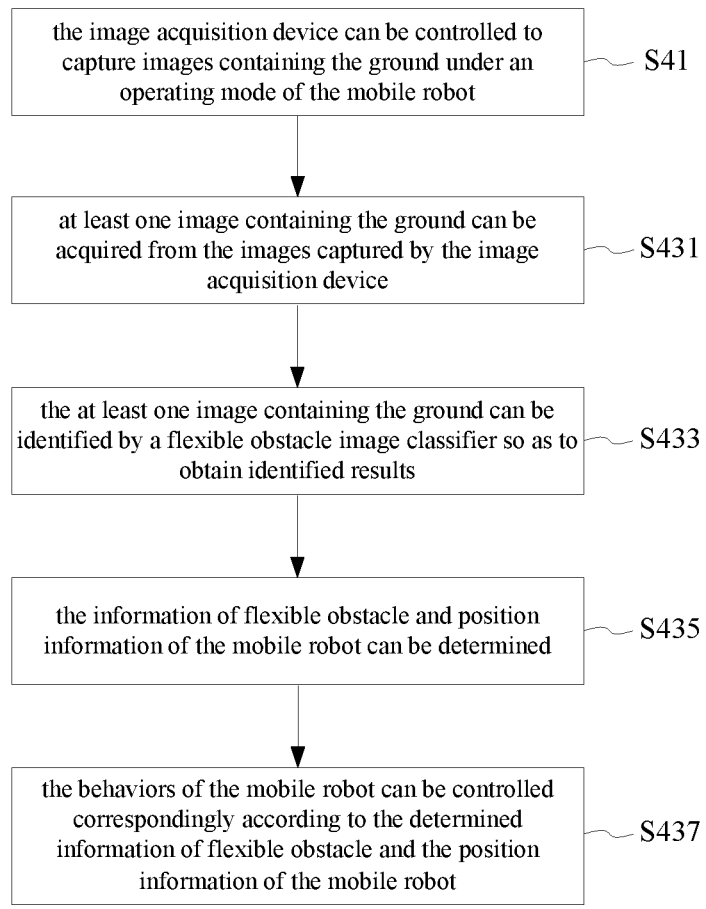
FIG. 8 is a detailed flow diagram of FIG. 7.

Please refer to FIG. 8 which is a detailed flow diagram of FIG. 7.

Please refer to FIG. 8, and step S43 further includes the following steps:

Step S431, at least one image containing the ground can be acquired from the images captured by the image acquisition device.

Step S433, the at least one image containing the ground can be identified by a flexible obstacle image classifier so as to obtain identified results.

The identification of flexible obstacles in the at least one image is realized by utilizing a flexible obstacle image classifier, that is, during identification, the images to be identified are input into the flexible obstacle image classifier and then identified results can be output. In the present embodiment, the flexible obstacle image classifier include a trained convolutional neural network. For specific flexible obstacles, corresponding training sample sets can be made, that is, the following training sample sets can be made: a cable training sample set corresponding to cables (for example, images of various cables shown in different forms on different grounds), a rope training sample set corresponding to ropes (for example, images of various ropes shown in different forms on different grounds), a ribbon training sample set corresponding to ribbons (for example, images of various ribbons shown in different forms on different grounds), a training sample set of the leftover of cloth corresponding to the leftover of cloth (for example, images of various leftover of cloth shown in different forms on different grounds), a cotton fibre training sample set corresponding to cotton fibres (for example, images of various cotton fibres shown in different forms on different grounds), and a plant vine training sample set corresponding to plant vines (for example, images of various plant vines shown in different forms on different grounds), and so on. As to the specific training process, please refer to the technical solution mentioned above about the mobile robot and the cleaning robot, and the specific training process will not be described herein.

In the present application, during image identification, the images to be identified are input into the flexible obstacle image classifier, and then the flexible obstacle image classifier outputs corresponding identified results. In some embodiments, the identification of images by the flexible obstacle image classifier can at least include the following steps: performing image preprocessing on the images to be identified; performing feature extraction on the preprocessed images; and inputting the features of the images to be identified into the flexible obstacle image classifier to obtain identified results.

Step S435, the information of flexible obstacle and position information of the mobile robot can be determined.

In step S435, after identified that the image contains the flexible obstacle and identified the type of the flexible obstacle, the position information of the mobile robot and the other information of flexible obstacle (for example, the position of flexible obstacle in the current physical space and the size information of flexible obstacle) can be determined.

On the one hand, determining the position information of the mobile robot can include: acquiring the positions of matching features in at least two images, and determining the position and pose of the mobile robot based on the corresponding relationship between an image coordinate system and a physical space coordinate system and based on the positions of matching features, wherein the at least two images contains an image at the previous time and an image at the current time.

In an embodiment, the corresponding relationship between an image coordinate system and a physical space coordinate system can be created in advance. Wherein, the image coordinate system is created based on image pixel points, and two-dimensional coordinate parameters of image pixel points in the image captured by the image acquisition device 13 can be described by the image coordinate system. The image coordinate system can be a rectangular coordinate system, a polar coordinate system or the like. For the physical space coordinate system, i.e., a coordinate system created based on each position in an actual two-dimensional or three-dimensional physical space, the physical space position thereof can be described in the physical space coordinate system according to the corresponding relationship between a preset image pixel unit and a unit length (or a unit angle). The physical space coordinate system can be a two-dimensional rectangular coordinate system, a polar coordinate system, a spherical coordinate system, a three-dimensional rectangular coordinate system or the like. For example, the physical space coordinate system can be camera coordinate system or world coordinate system.

To create the corresponding relationship, in some embodiments, the mobile robot creates the corresponding relationship based on the positions of the matching features in two image frames and the movement information acquired from the previous time to the current time, wherein, the at least two images contains an image at the previous time and an image at the current time.

During movement of the mobile robot, the movement information of the mobile robot and all the images captured by the image acquisition device can be acquired.

The acquisition of movement information of the mobile robot can be realized through the configured movement sensing device. The movement sensing device includes, but is not limited to, a displacement sensor, a gyroscope, a speed sensor, a ranging sensor and a cliff sensor. The acquired movement information includes, but is not limited to, displacement information, angle information, information about distance between the movement sensing device and an obstacle, velocity information and travelling direction information.

With regard to identifying and matching features in the captured images, and obtaining image positions of the matching features in each image, the mobile robot can acquire an image frame at the previous time and an image frame at current time according to a preset time interval or image frame number interval, and identify and match the features in two image frames. Wherein, according to the design of processing capabilities of hardware and software, the time interval can be between several milliseconds and several hundred milliseconds, and the image frame number interval can be between 0 frame and dozens of frames. The features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames.

The corresponding relationship can be created according to the image positions and the physical space position provided via the movement information. Here, the initialization device can create the corresponding relationship by creating feature coordinate parameters of the physical space coordinate system and the image coordinate system. For example, the initialization device can create the corresponding relationship between the physical space coordinate system and image coordinate systems by taking the physical space position where the image captured at the previous time as the origin of the physical space coordinate system and corresponding the coordinate origin to the positions of the matching features of the images in the image coordinate system.

After the corresponding relationship is created, the processing device acquires a matching feature in the image at the current time and the matching feature in the image at the previous time, and determines the position and pose of the robot according to the corresponding relationship and the features.

In order to obtain accurate localization, there are multiple matching features in general, for example, more than 10 matching features. Thus, the mobile robot seeks matching features from the identified features based on the positions of the identified features in respective image frames, and then localizes the position and pose of the robot based on the change in image pixels position corresponding to the feature. Wherein, the position of the robot can be obtained according to the displacement change in a two-dimensional plane, and the pose can be obtained according to the angle change in the two-dimensional plane.

On the other hand, the determination of information of flexible obstacle can include: acquiring at least one image, determining the position of flexible obstacle in the at least one image based on the positions of features in the at least one image, and determining the size information of the flexible obstacle based on the standard measurement in the at least one image.

With a cleaning robot as an example, since the cleaning robot often performs indoor cleaning, objects contained in the images captured by the image acquisition device generally includes a wall, a table, a sofa, a wardrobe, a television, a power socket, and a cable socket, and so on. In the example, firstly, the image acquisition device can be controlled to capture images under a navigation operating environment of the cleaning robot. And the pattern of an object in the captured images can be identified through image identification. Wherein the pattern of the object can be characterized by the feature such as gray scale of the object and contour of the object. Meanwhile, the pattern of the object are not limited to external geometric figure of the object, and can also include other graphic patterns shown on the objects, such as a two-holes on a power socket, a five-holes on a power socket, or a square hole on a cable socket. In view of this, for example, for a power socket and a cable socket with similar external geometric figures, the five-holes of a power socket and the square hole of a cable socket can be used for distinguishment. In addition, when the objects contained in the images captured by the image acquisition device of the cleaning robot include a power socket and a cable socket, since the power socket and the cable socket are designed according to the GB standard, they will not vary with the different environments in which they are located, thus they can be used as standard components. Standard physical features of standard component can include length, width and height of a power socket, and structural relationship of a five-holes on the power socket. In some implementations, the pattern of standard component and the standard physical features of standards component can be preset, and can be stored in the storage device of the robot in advance. Therefore, the manner of acquiring the standard physical feature of standard component includes reading preset standard physical feature from the storage device of the robot. Wherein the standard component can include the standard component which are designed based on at least one standard selected from the industrial standard, national standard, international standard and customized standard. For example, the industrial standard may be mechanical industry standard JB, building material industry standard JC, etc.; the national standard may be GB standard of China, DIN standard of Germany and BS standard of the UK, etc.; the international standard may be international ISO standard; and the customized standard will be described in detail below. The standard physical feature can include overall dimension, standard structural relationship, etc. For example, the standard physical features of a standard component include the actual physical length, width and height of the standard component, and other actual physical size data of corresponding standard in the standard component, for example, the spacing between two holes on a power socket, the length and width of the power socket, the length and width of a floor board or a floor tile, and the length, width and thickness of a carpet.

In addition, for the pattern of the object in the identified images and the pattern of a stored standard component, whether the identified at least one pattern is corresponding to the pattern of the stored standard component can be determined through an analysis on the corresponding relationship, similarities and consistencies of image contents, features, structures, relations, textures and gray scales, and when the identified at least one pattern is corresponding to the pattern of the stored standard component, the standard physical features of the standard components can be obtained. Wherein the at least one pattern corresponding to the pattern of the stored standard component is called as a standard pattern. With a power socket as an example, the pattern of a standard power socket can be stored, the whether the identified at least one pattern is corresponding to the pattern of the stored power socket can be determined through an analysis on the corresponding relationship, similarities and consistencies of image contents, features, structures, relations, textures and gray scales, and when the identified at least one pattern is corresponding to the pattern of the stored power socket, the standard physical features of the power socket can be obtained.

Therefore, based on the corresponding relationship between a preset unit pixel interval and the unit length in the actual physical space, and the size of the identified standard pattern and the real size of the corresponding standard physical features, the mobile robot can calculate the position of the flexible obstacle contained in the image in the current physical space and the size information of the flexible obstacle. With the socket arranged on the wall as an example, when the processing device identifies the socket and the boundary between the wall and the ground, or identifies the socket and tacitly approves that the socket is installed on the wall, based on the above corresponding relationship, the mobile robot can not only obtain the position of the flexible obstacle in the current physical space (for example, the distance and deflection angle between the flexible obstacle and the socket, the distance and deflection angle between the mobile robot and the socket, and the distance and deflection angle between the mobile robot and the flexible obstacle), but also obtain the size of flexible obstacle (for example, the length and thickness of flexible obstacle) and the area covered by flexible obstacle based on the space position relation of standard measure of a socket (for example, the length and width of the socket or the spacing between holes in a socket).

Step S437, the behaviors of the mobile robot can be controlled correspondingly according to the determined information of flexible obstacle and the position information of the mobile robot. In the present embodiment, wherein the behaviors of the mobile robot can at least include, but are not limited to, the movement of the mobile robot and the pose of the mobile robot.

In some embodiments, corresponding control of the behaviors of the mobile robot can include: based on the information of flexible obstacle and the position and pose of the mobile robot, controlling the mobile robot to move according to the original navigation route and cross the flexible obstacle, that is, if the flexible obstacle is identified, when determining that the flexible obstacle will not interfere with normal operation of the mobile robot based on the information such as type, size and/or position of the flexible obstacle, the mobile robot is controlled to move according to the original navigation route and cross the flexible obstacle. In one example, if the flexible obstacle contained in one image is identified to be cable or rope, and the cable or rope has smaller diameter and is placed regularly, or if the flexible obstacle contained in the image is identified to be leftover of cloth with a greater size and the leftover of cloth is paved on the ground, the mobile robot is controlled to move according to the original navigation route and cross the flexible obstacle. Wherein, in the process of controlling the cleaning robot to move according to the original navigation route, multiple implementations can be used. In one implementation, controlling the cleaning robot to move according to the original navigation route indicates controlling the cleaning robot to move according to the original navigation route at the original moving speed and the original pose. In another implementation, controlling the cleaning robot to move according to the original navigation route indicates controlling the cleaning robot to change the original moving speed and move according to the original navigation route at the changed moving speed and the original pose, herein, changing the original moving speed can include increasing or reducing the moving speed. In still another implementation, controlling the cleaning robot to move according to the original navigation route indicates controlling the cleaning robot to change the moving speed and the pose, and move according to the original navigation route at the changed moving speed and the changed pose, herein, changing the original moving speed can include increasing or reducing the moving speed.

In some embodiments, corresponding control of the behaviors of the mobile robot can include: based on the information of flexible obstacle and the position and pose of the mobile robot, controlling the mobile robot to modify the original navigation route, move according to the modified navigation route and cross the flexible obstacle. Specifically, if the flexible obstacle is identified, when determining that the flexible obstacle will probably interfere with normal operation of the mobile robot in the original navigation route but can be avoided through changing the original navigation route based on the information such as type, size and/or position of the flexible obstacle, the mobile robot is controlled to modify the original navigation route, move according to the modified navigation route and cross the flexible obstacle. In one example, if identified that the placement of the flexible obstacle contained in the image may possibly interfere with normal operation of the mobile robot (for example, the placement in the length direction of the cable, rope or thread residue is basically consistent with the original navigation route, or the cable, rope, thread residue or ribbon is just located below the walking wheel or at the inlet of the dust collection under the original navigation route), the mobile robot is controlled to modify the original navigation route, move according to the modified navigation route and cross the flexible obstacle. For example, the mobile robot can modify the original navigation route to make the modified navigation route being vertical to the placement of the flexible obstacle, so as to cross the flexible obstacle. Or the mobile robot can modify the original navigation route, so that when the robot crosses the flexible obstacle, the flexible obstacle will not be located below the wheel or inlet of the dust collection under the new navigation route. Wherein in the process in which the mobile robot is controlled to modify the original navigation route and move according to the modified navigation route, the moving speed of the mobile robot can be implemented in different ways, that is, the moving speed can be unchanged, or can be increased or reduced.

In some embodiments, corresponding control of the behaviors of the mobile robot can include: based on the information of flexible obstacle and the position and pose of the mobile robot, the mobile robot is controlled to modify the original navigation route, move according to the modified navigation route to avoid the flexible obstacle. Specifically, if the flexible obstacle is identified, when determining that the flexible obstacle will probably interfere with normal operation of the mobile robot based on the information such as type, size and/or position of the flexible obstacle, the mobile robot is controlled to modify the original navigation route, move according to the modified navigation route to avoid the flexible obstacle. In one example, if identified that the flexible obstacle contained in the image is cable, rope or leftover of cloth, and the cable or rope is placed irregularly, or if identified that the flexible obstacle contained in the image is cable or rope with greater size, or if identified that the flexible obstacle contained in the image is thread residue or ribbon, the mobile robot can be controlled to modify the original navigation route, move according to the modified navigation route to avoid the flexible obstacle.

In some embodiments, corresponding control of the behaviors of the mobile robot can include: based on the information of flexible obstacle and the position and pose of the mobile robot, the mobile robot is controlled to stop moving. Specifically, if flexible obstacle is identified, when determining that the flexible obstacle will probably interfere with normal operation of the mobile robot or when failing to determine the interference degree of the flexible obstacle on normal operation of the mobile robot effectively based on the information such as type, size and/or position of the flexible obstacle, the mobile robot is controlled to stop moving.

In some embodiments, corresponding control of the behaviors of the mobile robot can include: based on the information of flexible obstacle and the position and pose of the mobile robot, controlling the mobile robot to move according to the original navigation route without considering the flexible obstacle. Specifically, if the flexible obstacle is identified, when determining that the flexible obstacle is not on the original navigation route based on the information such as type, size and/or position of the flexible obstacle, the mobile robot is controlled to move according to the original navigation route. In one example, if identified that the flexible obstacle contained in the image is cable or rope, and the cable or rope is arranged close to the corner of the wall, or if identified that the flexible obstacle contained in the image is thread residue, scarves or leftover of cloth, and the thread residue, scarves or leftover of cloth is located below a table or a sofa while the cleaning of the table or sofa is not included in the navigation route, the mobile robot is controlled to move according to the original navigation route and ignore the flexible obstacle In addition, the mobile robot being controlled to output alarm information can be further included, that is, if flexible obstacle is identified, information of finding out flexible obstacle can be sent out immediately, such that operators can remove the flexible obstacle so as to remove obstacles.

As to the control method of the mobile robot in the present application, through the technical solution in which an image acquisition device can be controlled to capture images containing the ground, at least one captured image containing the ground is identified, and the behaviors of the mobile robot are controlled when identified that the image contains flexible obstacle, the flexible obstacle can be detected effectively, and the behaviors of the mobile robot can be controlled correspondingly based on detection results.

In addition, it should also be noted that, through the description of the above implementations, those skilled in the art can clearly understand that part or all of the present application can be realized by means of software and in combination with necessary general-purpose hardware platforms. Based on this, the present application further provides a storage medium of an electronic device, the storage medium stores one or more programs, and when the one or more programs are executed by one or more processors, the control method described above can be performed.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory or other types of media/machine readable media which are applicable to storing machine executable instructions. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor-based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for controlling a mobile robot, wherein the mobile robot comprises a processing device and an image acquisition device, and the method is performed by the processing device and comprises the following steps:
    under an operating mode of the mobile robot, controlling the image acquisition device to capture pictures in order to acquire images containing the ground; and
    identifying by a flexible obstacle image classifier, at least one image containing the ground captured by the image acquisition device, and controlling behaviors of the mobile robot when identified that the at least one image contains a flexible obstacle;
    wherein, a manner of controlling behaviors of the mobile robot comprises:
        acquiring positions of matching features in at least two images, and determining a position and a pose of the mobile robot based on a corresponding relationship between an image coordinate system and a physical space coordinate system and based on the positions of the matching features, wherein, the at least two images are an image at a previous time and an image at the current time respectively;
        acquiring at least one image, determining a position of the flexible obstacle in the at least one image based on the positions of features in the at least one image, and determining a size information of the flexible obstacle based on a standard measure in the at least one image; and
        controlling behaviors of the mobile robot based on the determined position and pose of the mobile robot and based on the position and the size information of the flexible obstacle.

2. The method for controlling a mobile robot of claim 1, wherein, a manner of acquiring the positions of matching features in at least two images comprise tracking positions of corresponding features contained in at least two images, wherein, the corresponding features are a pair of matching features.

3. The method for controlling a mobile robot of claim 1, wherein, a manner of determining a size information of the flexible obstacle based on a standard measure in the at least one image comprises:
    identifying a reference object with a known size in the at least one image; and
    calculating the size information of the flexible obstacle in the at least one image based on the size of the reference object.

4. The method for controlling a mobile robot of claim 1, further comprising a step of acquiring movement information of the mobile robot.

5. The method for controlling a mobile robot of claim 1, wherein, the step of controlling behaviors of the mobile robot comprises any one of the following steps:
    controlling the mobile robot to move according to an original navigation route and cross the flexible obstacle;
    controlling the mobile robot to modify the original navigation route, move according to the modified navigation route and cross the flexible obstacle;
    controlling the mobile robot to modify the original navigation route, move according to the modified navigation route to avoid the flexible obstacle.

6. The method for controlling a mobile robot of claim 1, wherein, the step of controlling behaviors of the mobile robot comprises: controlling the mobile robot to stop moving.

7. The method for controlling a mobile robot of claim 5, further comprising a step of controlling the mobile robot to send alarm information.

8. A mobile robot, comprising:
    a storage device, configured to store a simultaneous localization and mapping application and a behavior control application;
    an image acquisition device, configured to acquire images of an operating environment under an operating mode of the mobile robot;
    a processing device, connected with the storage device and the image acquisition device, and configured to control the image acquisition device to capture pictures in order to acquire at least one image containing the ground under the operating mode of the mobile robot, identify the at least one image containing the ground by a flexible obstacle image classifier, and invoke the simultaneous localization and mapping application and the behavior control application from the storage device to control behaviors of the mobile robot when identified that the image contains a flexible obstacle; and a movement system, connected with the processing device, and configured to drive the mobile robot to move based on a control instruction output by the processing device;

wherein, the processing device is configured to invoke the simultaneous localization and mapping application and the behavior control application from the storage device to perform the following steps:

acquiring positions of matching features in at least two images, and determining a position and a pose of the mobile robot based on a corresponding relationship between an image coordinate system and a physical space coordinate system and based on the positions of the matching features, wherein, the at least two images are an image at a previous time and an image at the current time respectively;

acquiring at least one image, determining a position of the flexible obstacle in the at least one image based on the positions of features in the at least one image, and determining a size information of the flexible obstacle based on a standard measure in the at least one image; and controlling behaviors of the mobile robot based on the determined position and pose of the mobile robot and based on the position and the size information of the flexible obstacle.

9. The mobile robot of claim 8, wherein, the image acquisition device is arranged at the top surface of the mobile robot, or at a side surface of the mobile robot, or at the junction of the top surface and a side surface of the mobile robot.

10. The mobile robot of claim 8, further comprising a tracking device, which is connected with the image acquisition device and configured to track positions of corresponding features contained in the at least two images to acquire positions of matching features in the at least two images, wherein, the corresponding features are a pair of matching features.

11. The mobile robot of claim 10, further comprising a movement sensing device which is connected with the processing device and configured to acquire movement information of the mobile robot.

12. The mobile robot of claim 8, wherein, a manner of invoking the simultaneous localization and mapping application and the behavior control application from the storage device to control behaviors of the mobile robot comprises any of the following ways:

sending the control instruction to the movement system to control the mobile robot to move according to an original navigation route and cross the flexible obstacle;

sending the control instruction to the movement system to control the mobile robot to modify the original navigation route, move according to the modified navigation route and cross the flexible obstacle; and sending the control instruction to the movement system to control the mobile robot to modify the original navigation route, move according to the modified navigation route to avoid the flexible obstacle.

13. The mobile robot of claim 8, wherein, the step of invoking the simultaneous localization and mapping application and the behavior control application from the storage device to control behaviors of the mobile robot comprises: sending the control instruction to the movement system to control the mobile robot to stop moving.

14. The mobile robot of claim 8, further comprising an alarm device which is connected with the processing device and configured to output an alarm information when the processing device identified that the image contains a flexible obstacle.

15. The mobile robot of claim 8, further comprising a cleaning system which is connected with the control system and configured to clean the ground during the movement of the mobile robot.

16. A system for controlling a mobile robot, wherein the mobile robot is configured with an image acquisition device, and the system comprises:

a storage device, configured to store a simultaneous localization and mapping application and a behavior control application; and a processing device, connected with the storage device and the image acquisition device, and configured to control the image acquisition device to capture pictures in order to acquire at least one image containing the ground under an operating mode of the mobile robot, identify the at least one image containing the ground by a flexible obstacle image classifier, and invoke the simultaneous localization and mapping application and the behavior control application from the storage device to control behaviors of the mobile robot when identified that the image contains a flexible obstacle wherein, the processing device is configured to invoke the simultaneous localization and mapping application and the behavior control application from the storage device to perform the following steps:

acquiring positions of matching features in at least two images, and determining a position and a pose of the mobile robot based on a corresponding relationship between an image coordinate system and a physical space coordinate system and based on the positions of the matching features, wherein, the at least two images are an image at a previous time and an image at the current time respectively;

acquiring at least one image, determining a position of the flexible obstacle in the at least one image based on the positions of features in the at least one image, and determining a size information of the flexible obstacle based on a standard measure in the at least one image; and controlling behaviors of the mobile robot based on the determined position and pose of the mobile robot and based on the position and the size information of the flexible obstacle.

* * * * *